United States Patent [19]

Shirako et al.

[11] 4,428,479

[45] Jan. 31, 1984

[54] ACCESSORY FOR TAPE-CASSETTE STORAGE BOX

[75] Inventors: Hideo Shirako, Hachioji; Shoichi Saito, Tokyo, both of Japan

[73] Assignee: Olympus Optical Co., Ltd., Tokyo, Japan

[21] Appl. No.: 328,704

[22] Filed: Dec. 8, 1981

[30] Foreign Application Priority Data

Dec. 9, 1980 [JP] Japan .......................... 55-176298[U]

[51] Int. Cl.³ .......................................... B65D 85/672
[52] U.S. Cl. .................................... 206/387; 220/23.4
[58] Field of Search ................. 220/23.4, 23.83, 23.86; 206/387

[56] References Cited

U.S. PATENT DOCUMENTS

| | | | |
|---|---|---|---|
| 3,460,899 | 8/1969 | Miller | 220/23.4 |
| 3,603,475 | 9/1971 | Erichman | 220/23.4 |
| 3,647,105 | 3/1972 | Keeslar | 220/23.4 |
| 3,658,204 | 4/1972 | Bottger | 220/23.4 |
| 3,840,142 | 10/1974 | Tsukada | 220/23.4 |
| 3,994,408 | 11/1976 | Belitzky | 220/23.4 |
| 4,094,431 | 6/1978 | Wheeler | 220/23.86 |
| 4,275,943 | 6/1981 | Gelardi et al. | 220/23.4 |

FOREIGN PATENT DOCUMENTS 666050  2/1952  United Kingdom ............... 220/23.4

*Primary Examiner*—Joseph Man-Fu Moy

[57] ABSTRACT

An accessory for use to a tape-cassette storage box including first-to-fourth engaging claws arranged on a first outer surface of a storage box body, and first-to-fourth engaged claws arranged on a second outer surface of the storage box body, comprises an accessory body having a space in which articles are held, an outer surface portion on which at least one of first unit including first-to-fourth engaging claw and second unit including first-to-fourth engaged claw is arranged, and a movable member attached to the accessory body and freely swingable between a first position at which the movable member cooperates with the accessory body to house said articles in the accessory body and a second position at which the movable member allows said articles to be housed in and taken out of the accessory body.

16 Claims, 24 Drawing Figures

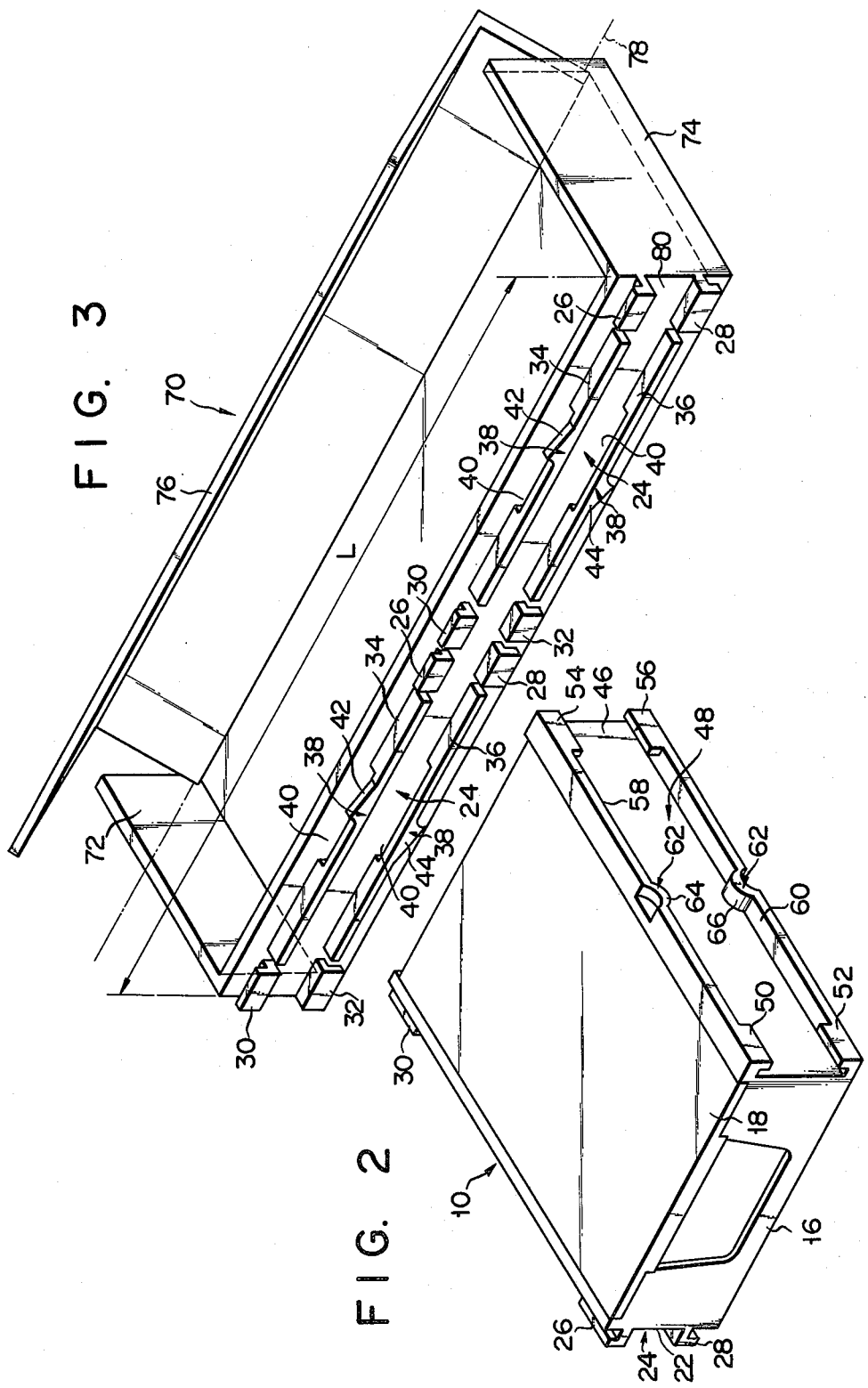

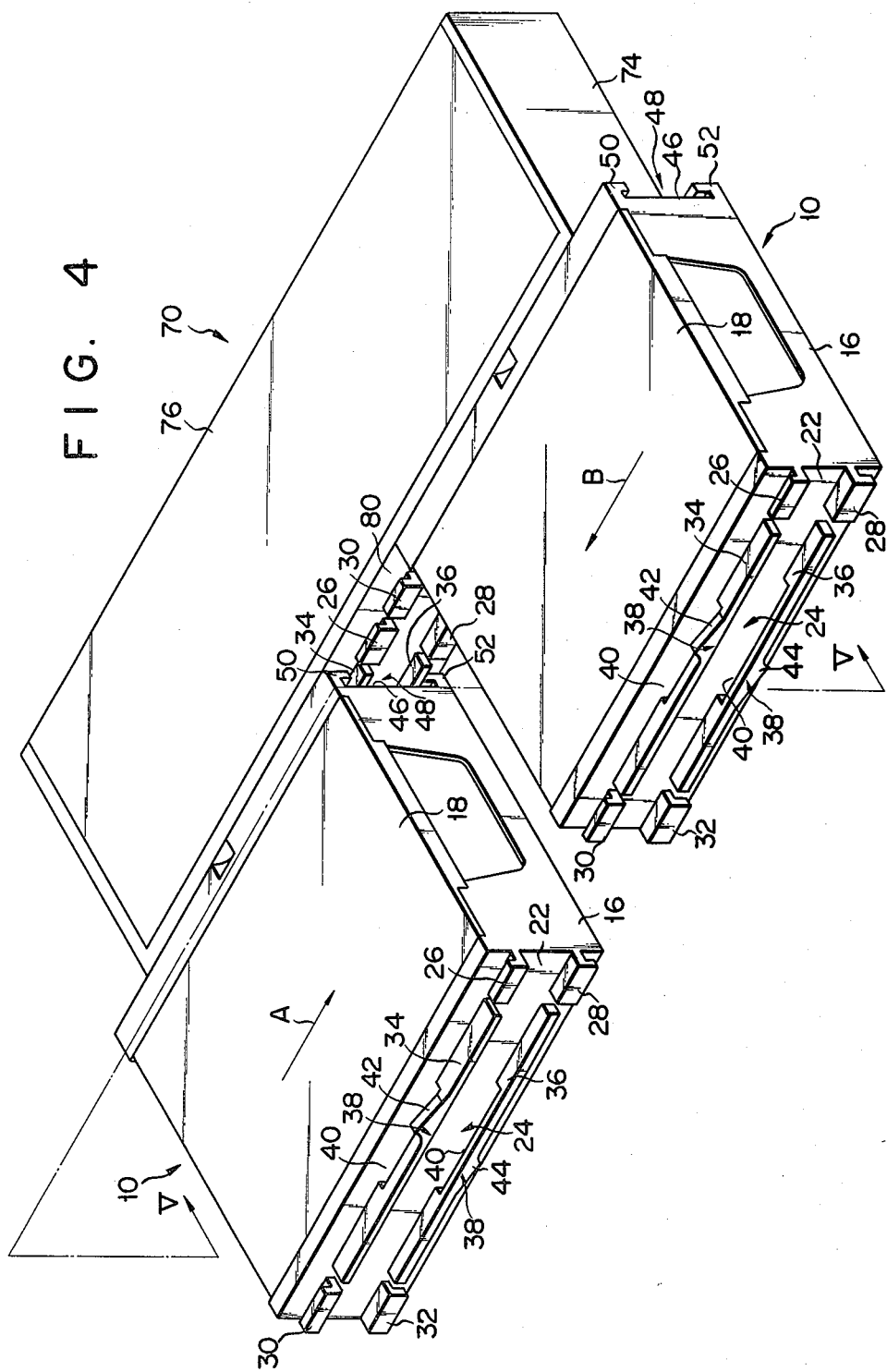

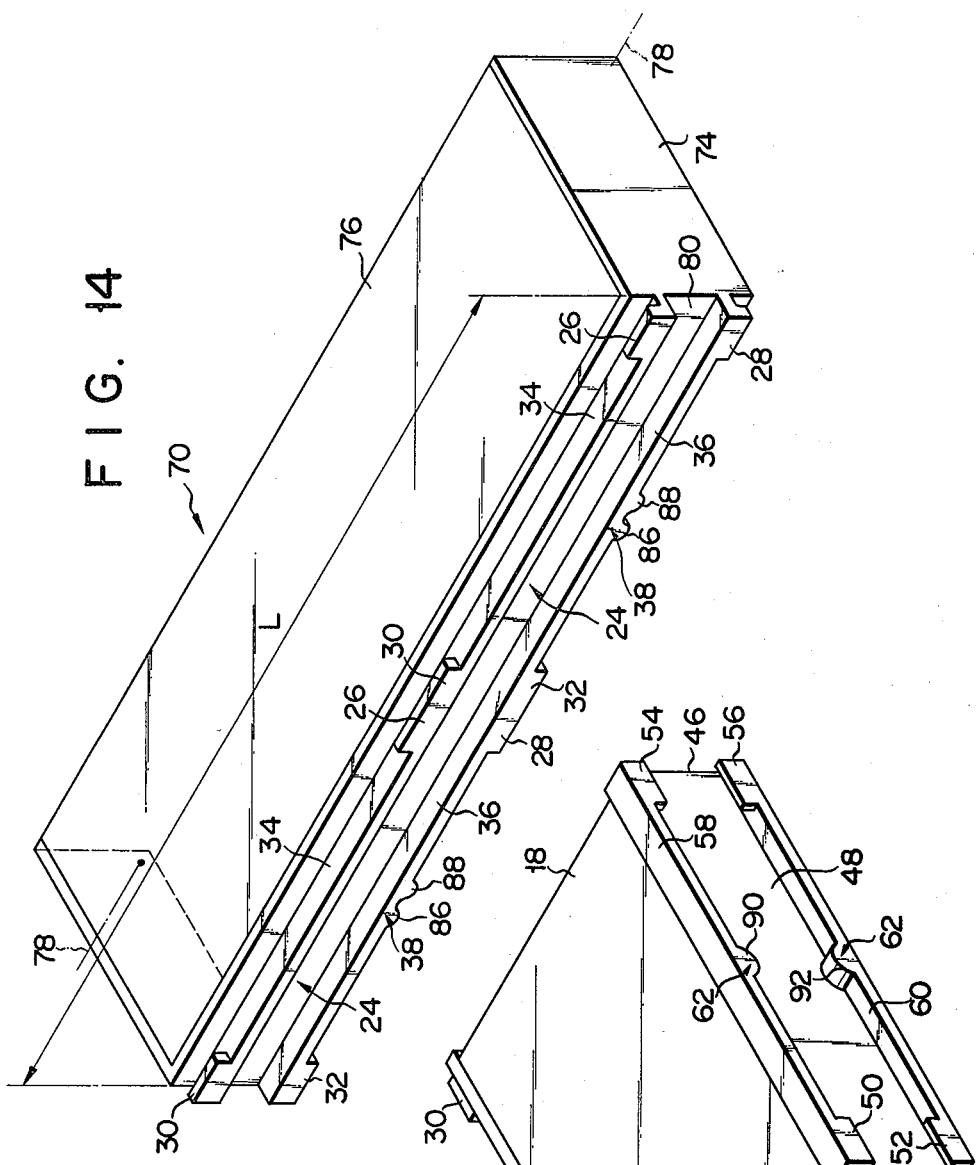

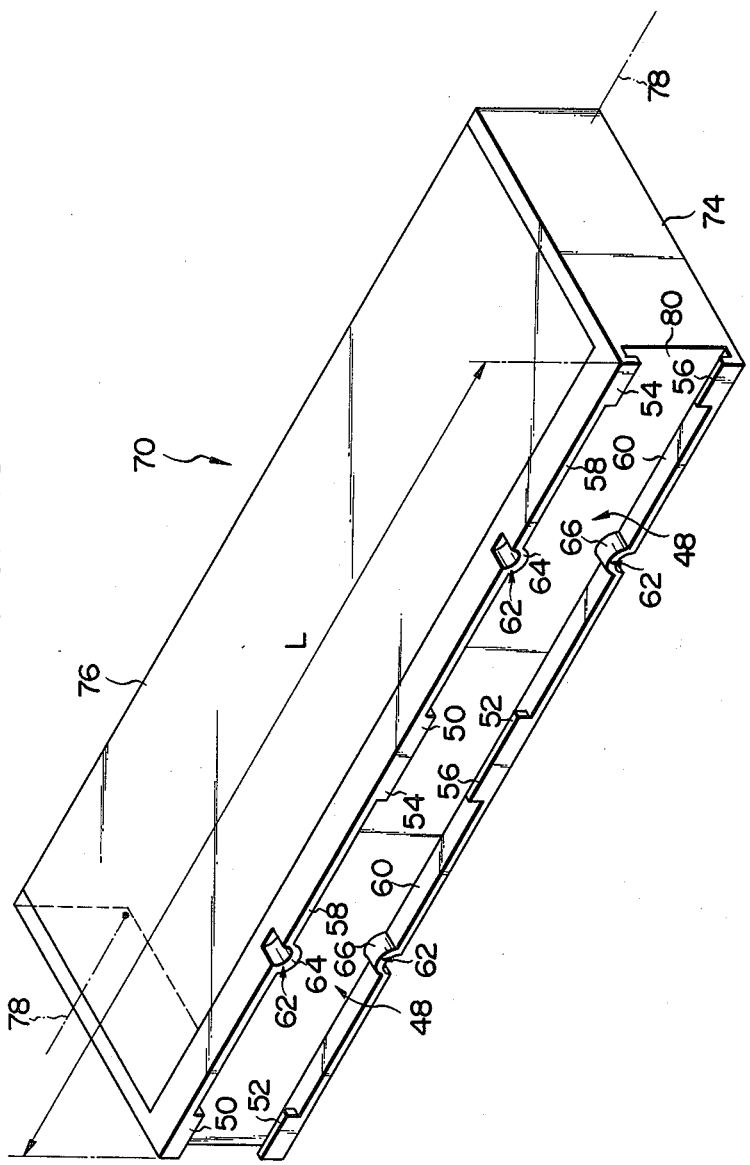

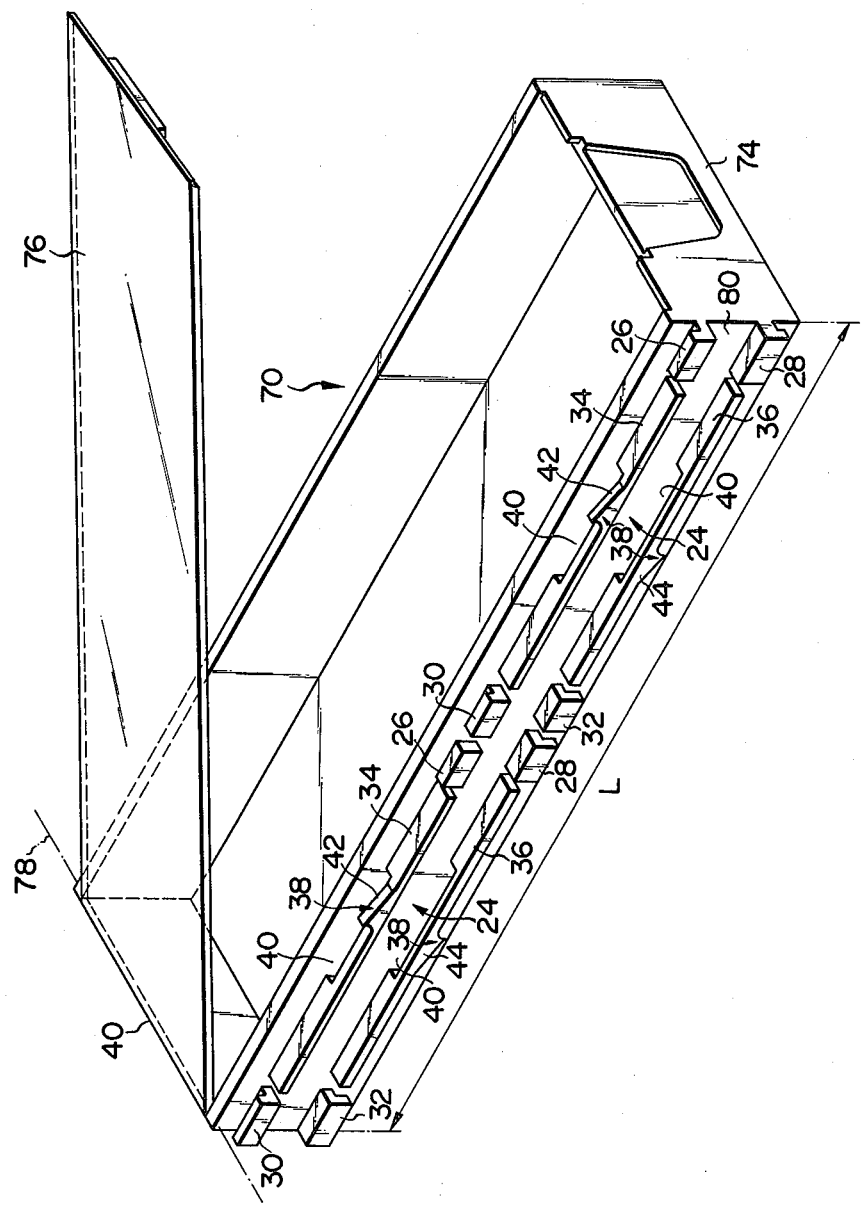

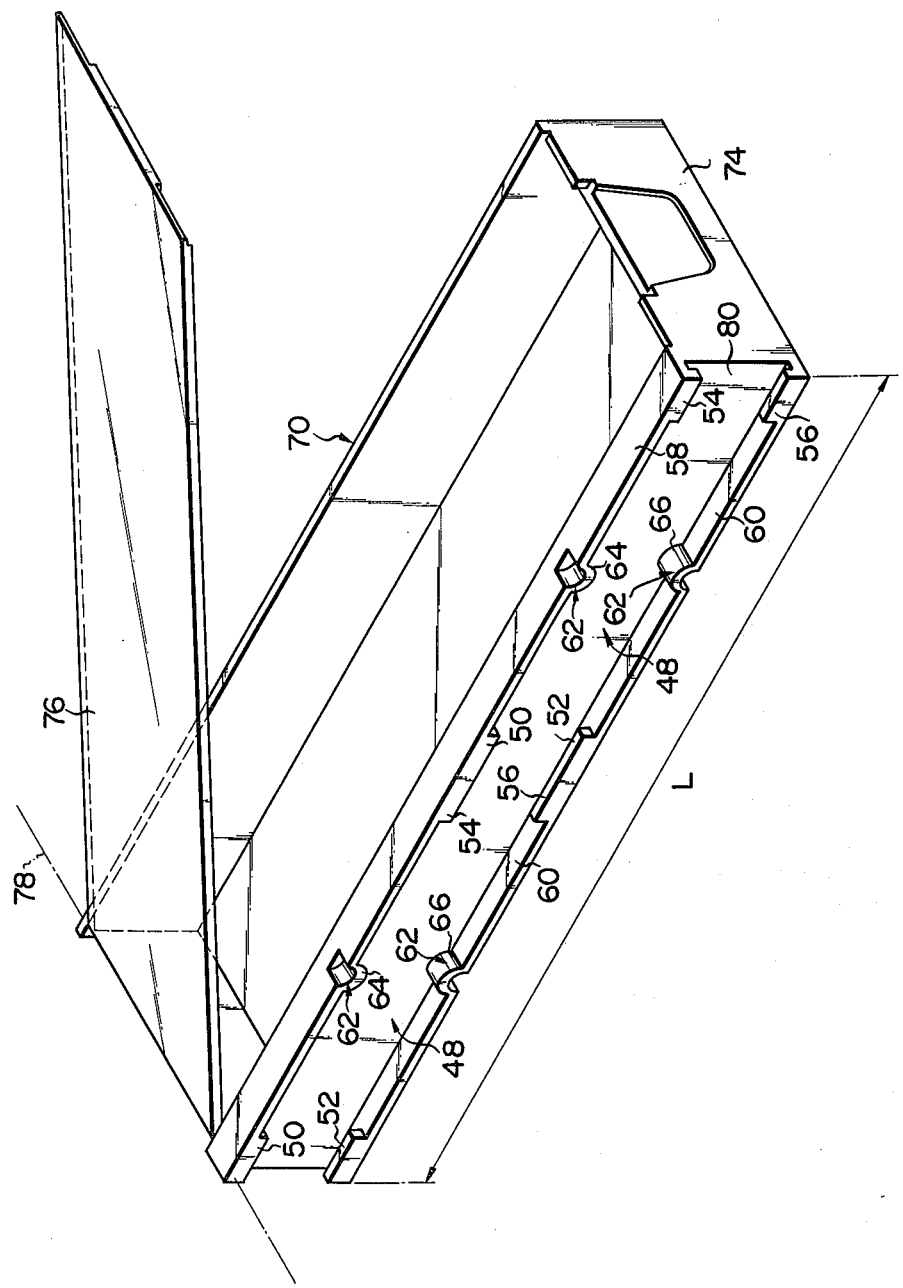

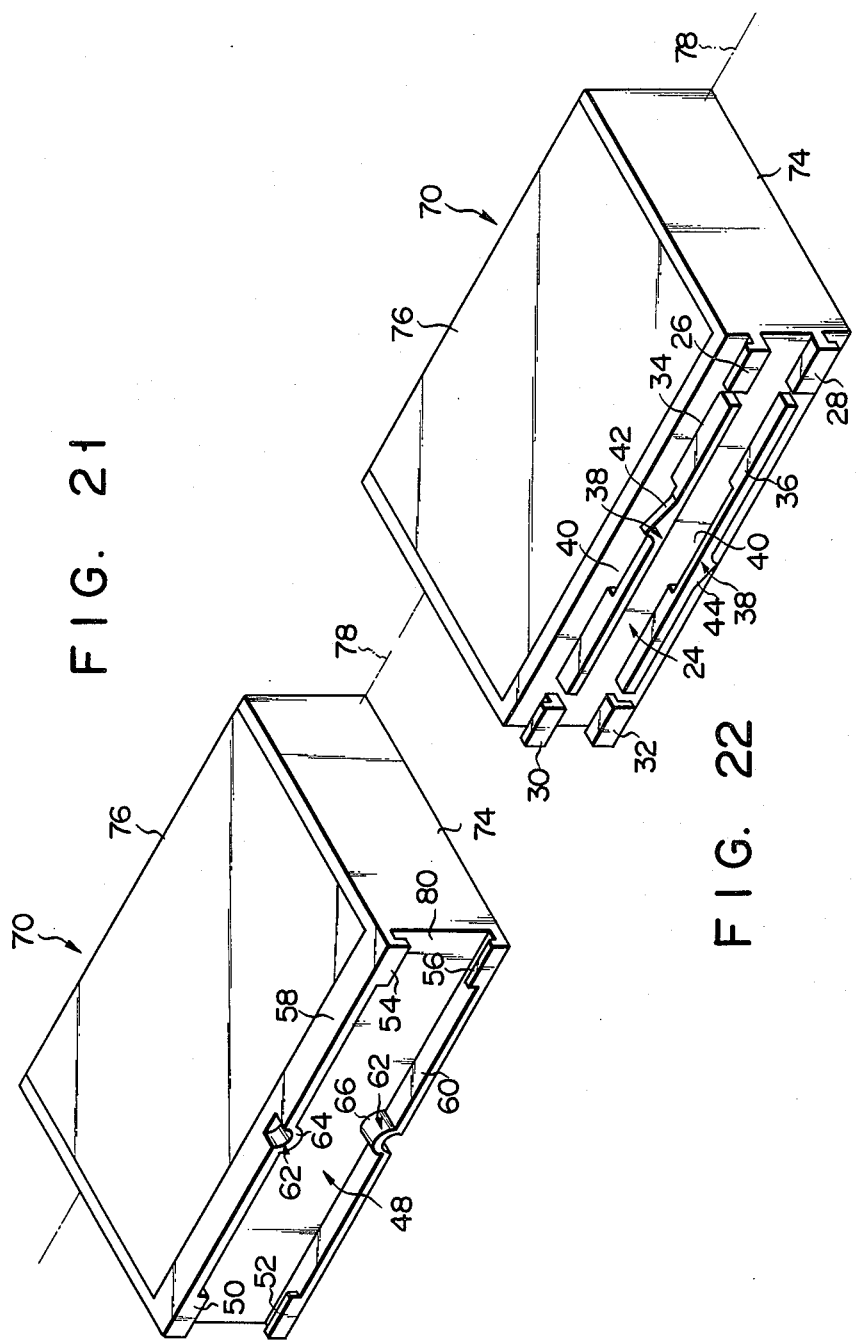

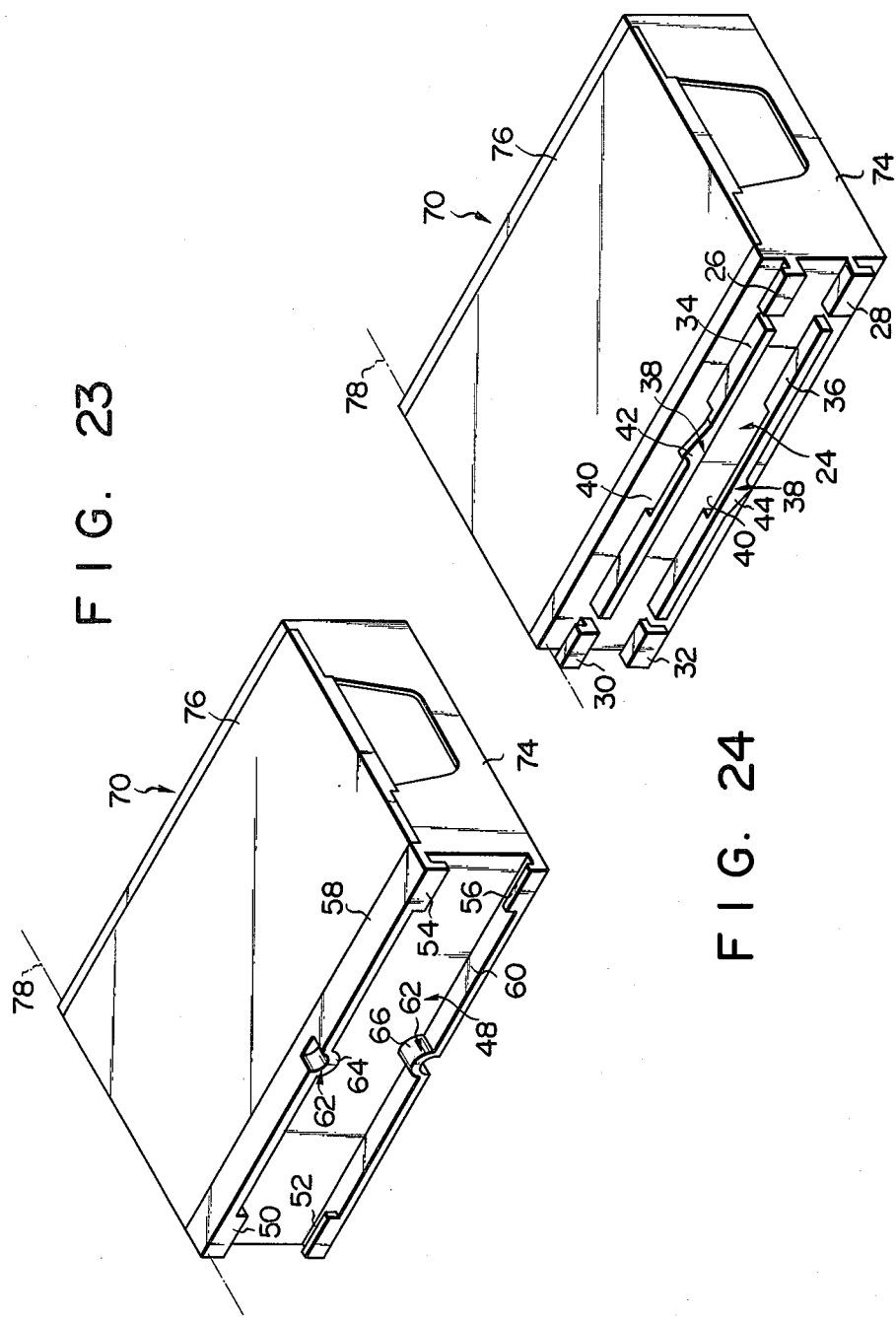

4,428,479

ACCESSORY FOR TAPE-CASSETTE STORAGE BOX

BACKGROUND OF THE INVENTION

The present invention relates to an accessory freely detachable from a box for storing a tape cassette called micro-cassette.

A variety of tape recorders made in size as small as possible to promote their sale have prevailed on the market these days. These tape recorders intended to be made small-sized have no unnecessary space therein. Therefore, a space for storing articles such as an earphone, head cleaner and connection code belonging to the tape recorder can not be formed in these tape recorders. When one of these conventional tape recorders is to be carried to another place and used there together with articles, these articles must be carried independently of tape recorder. Comparatively long time and large labor are therefore wasted to take out articles just before they are practically used. In addition, there is a possibility that these articles are left and lost anywhere.

SUMMARY OF THE INVENTION

The present invention is intended to eliminate above-mentioned drawbacks.

The object of the present invention is therefore to provide an accessory for a tape-cassette storage box capable of reducing time and labor necessary to take out articles belonging to the tape recorder just before they are practically used, and also capable of eliminating the possibility that these articles are left and lost anywhere.

BRIEF DESCRIPTION OF THE DRAWINGS

FIG. 2 is a perspective view showing the right side face of the tape-cassette storage box shown in FIG. 1, in which the cover member is in a first position and a second engaging means and a held means are shown;

FIG. 3 is a perspective view showing the left side face of an accessory according to a first embodiment of the present invention, in which the center line around which a movable member is swingable crosses front and back end faces of an accessory body, the movable member is in a second position, and two of a first engaging means and two of a holding means are arranged on the left side face of the accessory body;

FIG. 4 is a perspective view showing the condition under which the second engaging means of tape-cassette storage box shown in FIG. 1 is just to be engaged with each of first engaging means on the left side face of the accessory according to the first embodiment of the present invention, in which the movable member is in a first position;

FIG. 14 is a perspective view showing the left side face of an accessory according to a second embodiment of the present invention, in which a center line around which a movable member is swingable crosses front and back end faces of an accessory body and the movable member is in the first position;

FIG. 15 is a perspective view showing the right side face of a tape-cassette storage box provided with a second engaging means which is to be engaged with a first engaging means on the left side face of the accessory according to the second embodiment of the present invention;

FIG. 18 is a perspective view showing a variation of the accessory shown in FIG. 3, in which two second engaging means and two held means are arranged on the left side face of the accessory body;

FIG. 19 is a perspective view showing another variation of the accessory shown in FIG. 3, in which a center line around which a movable member is swingable crosses left and right side faces of the accessory body and the movable member is in the second position;

FIG. 20 is a perspective view showing a variation of the accessory shown in FIG. 14, in which a center line around which a movable member is swingable crosses left and right side faces of the accessory body and the movable member is in the second position;

FIG. 21 is a perspective view showing a variation of the accessory according to the present invention, in which a center line around which a movable member is swingable crosses front and back end faces of the accessory body, the movable member is in the first position, and a second engaging means and a held means are arranged on the left side face of the accessory body;

FIG. 22 is a perspective view showing another variation of the accessory according to the present invention, in which a center line around which a movable member is swingable crosses front and back end faces of the accessory body, the movable member is in the first position, and a first engaging means and a holding means are arranged on the left side face of the accessory body;

FIG. 23 is a perspective view showing another variation of the accessory according to the present invention, in which a center line around which a movable member is swingable crosses left and right side faces of the accessory body, the movable member is in the first position, and a second engaging means and a held means are arranged on the left side face of the accessory body; and FIG. 24 is a perspective view showing another variation of the accessory according to the present invention, in which a center line around which a movable member is swingable crosses left and right side faces of the accessory body, the movable member is in the first position, and a first engaging means and a holding means are arranged on the left side face of the accessory body.

Now there will be described several embodiments of this invention with reference to the accompanying drawings.

DETAILED DESCRIPTION OF THE PREFERRED EMBODIMENTS

Figure 1:
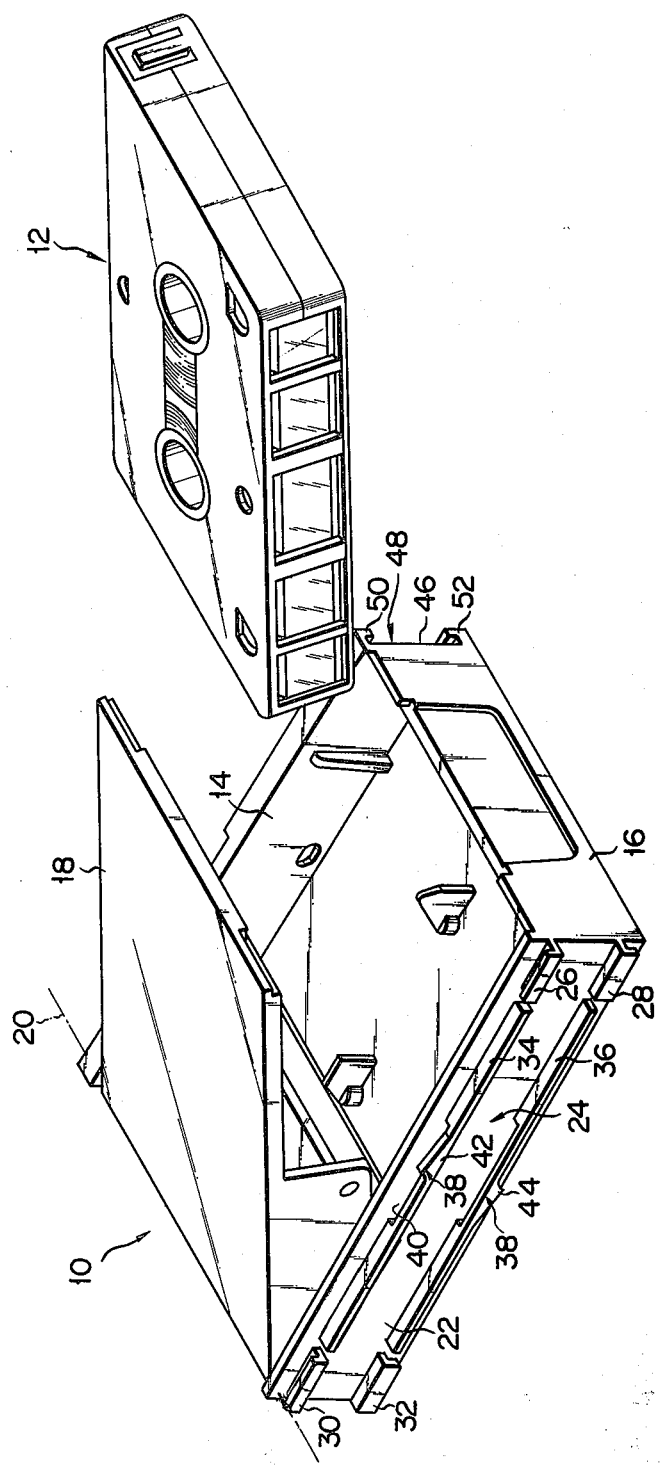
FIG. 1 is a perspective view showing the left side face of a tape-cassette storage box and a micro-cassette, in which a cover member is in a second position and a first engaging means and a holding means are shown.

FIG. 1 shows a tape-cassette storage box 10 and a micro-cassette 12. The tape-cassette storage box 10 has a box body 16 provided with a space 14 in which the micro-cassette 12 is held. The space 14 is opened on the upper surface side of the box body 16. A cover member 18 is attached to the box body 16 by means of well-known means such as the combination of pins and holes. The cover member 18 is arranged in the same level as the upper surface of the body 16 and freely swingable around a center line 20 between a first position at which the opening of the space 14 is closed and a second position shown in FIG. 1. When the cover member 18 is in the second position, the micro-cassette 12 can be fitted into or held in the space 14 of the box body 16 and the micro-cassette 12 already fitted or held there can also be taken out of the space 14. When the cover member 18 is in the first position and the micro-cassette 12 is held in the space 14 of the box body 16, the micro-cassette 12 is under the condition of being housed by the cover member 18 in the box body 16.

A left side face 22 (which will be hereinafter referred to as a first outer surface) of the box body 16 is of rectangular shape, about 51 mm long in a longitudinal direction thereof, and has a first engaging means 24 as shown in FIG. 1.

The first engaging means 24 has a first engaging claw 26 arranged at the right upper end (which will be hereinafter referred to as a first corner) of the first outer surface 22, as shown in FIG. 1.

The first engaging means 24 also has a second engaging claw 28 arranged at the right lower end (which will be hereinafter referred to as a second corner) of the first outer surface 22.

The first engaging means 24 also has a third engaging claw 30 arranged at the left upper end (which will be hereinafter referred to as a third corner) of the first outer surface 22.

The first engaging means 24 also has a fourth engaging claw 32 arranged at the left lower end (which will be hereinafter referred to as a fourth corner) of the first outer surface 22.

Each of first and third engaging claws 26 and 30 32 is projected from the first outer surface 22 and substantially perpendicular to the first outer surface 22, and bent at the foremost end thereof upwards e.g. in the direction of its departing from the second or fourth engaging claw 28 or 32. First and third engaging claws 26 and 30 are same in shape and dimension.

Each of second and fourth engaging claws 28 and 32 is projected from the first outer surface 22 in a direction substantialy perpendicular to the first outer surface 22 and then bent at the foremost end thereof downwards e.g. in the direction of its departing from the first or third engaging claw 26 or 30. Second and fourth engaging claws 28 and 32 are same as the first engaging claw 26 in shape and dimension except that the projected foremost end of each of second and fourth engaging claws 28 and 32 is bent downwards.

The first engaging means 24 has a first guide member 34 arranged on the first outer surface 22 between first and third engaging claws 26 and 30, and a second guide member 36 arranged on the first outer surface 22 between second and fourth engaging claws 28 and 32.

The first guide member 34 is arranged on an imaginary line combining the first engaging claw 26 with the third one 30 and is a band-shaped plate projected from the first outer surface 22 in a direction substantially perpendicular to the first outer surface 22.

The second guide member 36 is arranged on an imaginary line combining the second engaging claw 28 with the fourth one 32 and is a band-shaped plate projected from the first outer surface 22 in a direction substantially perpendicular to the first outer surface 22.

First and second guide members 34 and 36 are arranged parallel to each other. The first engaging claw 26 is parallel to the second engaging claw 28 and the third engaging claw 30 is also parallel to the fourth engaging claw 32.

First-to-fourth engaging claws 26, 28, 30, 32 and first and second guide members 34, 36 are formed integrally by injection molding using resilient synthetic resin to the first outer surface 22 of the box body 16 with a space interposed therebetween.

A holding means 38 is arranged on the first outer surface 22 as shown in FIG. 1. The holding means 38 has an opening 40 in the center of the longitudinal direction of each of first and second guide members 34 and 36. Thanks to the opening 40, the center portion of each of first and second guide members 34 and 36 can be resiliently curved in upper and lower directions along the first outer surface 22.

The holding means 38 has a first stopper 42 formed on the upper face of the center portion of the first guide member 34. The first stopper 42 is projected upwards from the upper face and positioned slightly nearer to the first engaging claw 26. The upper face of first stopper 42 comprises a inclined face positioned on the front end side of the upper face of the first stopper 42 e.g. on the side of the first engaging claw 26 and going upwards as it comes nearer the back end of first outer surface 22, and a downwardly-convexed face positioned on the back end side of the upper face of the first stopper 42 e.g. on the side of third engaging claw 30 and combining the inclined face with the upper face of the first guide member 34.

The holding means 38 also has a second stopper 44 formed on the underside of the center portion of the second guide member 36 and projected from the upper face thereof. The second stopper 44 is positioned slightly nearer to the fourth engaging claw 32. The under face of the second stopper 44 comprises an inclined face positioned on the back end side of the under face of the second stopper 44 e.g. on the side of the fourth engaging claw 32 and going downwards as it comes nearer the front end of the first outer surface 22, and an upwardly-convexed face positioned on the front end side of the under face of the second stopper 44 e.g. on the side of the second engaging claw 28 and combining the inclined face with the under face of the second guide member 36.

A right side face 46 (which will be hereinafter referred to as a second outer surface) of the box body 16 is of rectangular shape, about 51 mm long in a longitudinal direction thereof, and has a second engaging means 48, as shown in FIG. 2.

The second engaging means 48 has a first engaged claw 50 arranged at the left upper end (which will be hereinafter referred to as a first corner) of the second outer surface 46.

The second engaging means 48 also has a second engaged claw 52 arranged at the left lower end (which will be hereinafter referred to as a second corner) of the second outer surface 46.

The second engaging means 48 also has a third engaged claw 54 arranged at the right upper end (which will be hereinafter referred to as a third corner) of the second outer surface 46.

The second engaging means 48 also has a fourth engaged claw 56 arranged at the right lower end (which will be hereinafter referred to as a fourth corner) of the second outer surface 46.

Each of first and third engaged claws 50 and 54 is projected from the second outer surface in a direction substantially perpendicular to the second outer surface 46 and then bent at the foremost end thereof downwards e.g. toward the second or fourth engaged claw 52 or 56. First and third engaged claws 50 and 54 are same in shape and dimension.

Each of second and fourth engaged claws 52 and 56 is projected from the second outer surface 46 in a direction substantially perpendicular to the second outer surface 46 and then bent at the foremost end thereof upwards e.g. toward the first or third engaged claw 50 or 54. Second and fourth engaged claws 52 and 56 are same as the first engaged claw 50 in shape and dimension except that second and fourth engaged claws are bent upwards at the foremost ends thereof.

The second engaging means 48 has a third guide member 58 arranged on the second outer surface 46 between first and third engaged claws 50 and 54. The second engaging means 48 also has a fourth guide member 60 arranged on the second outer surface 46 between second and fourth engaged claws 52 and 56.

The third guide member 58 is arranged on an imaginary line combining the first engaged claw 50 with the third engaged claw 54, or along the upper edge of the second outer surface 46 in this embodiment and is a band-shaped plate projected from the second outer surface 46 in a direction substantially perpendicular to the second outer surface 46.

The fourth guide member 60 is arranged on an imaginary line combining the second engaged claw 52 with the fourth engaged claw 56, or along the lower edge of the second outer surface 46 in this embodiment and is a band-shaped plate projected from the second outer surface 46 in a direction substantially perpendicular to the second outer surface 46.

Third and fourth guide members 58 and 60 are arranged parallel to each other. The first engaged claw 50 is parallel to the second one 52 and the third engaged claw 54 is parallel to the fourth one 56.

First-to-fourth engaged claws 50, 52, 54, 56 and third and fourth guide members 58, 60 are formed integrally by an injecton molding using resilient synthetic resin to the second outer surface 46 of case body 16.

The first engaged claw 50 is continuous from the third guide member 58, which is also continuous from the third engaged claw 54. The second engaged claw 52 is continuous from the fourth guide member 60, which is also continuous from the fourth engaged claw 56. First and third engaged claws 50 and 54 and the third guide member 58 thus continuous from one another are spaced from second and fourth engaged claws 52 and 56 and the fourth guide member 60 thus continuous from one another.

A held means 62 is arranged on the second outer surface 46, as shown in FIG. 2.

The held means 62 has a first engaged projection 64 projected downwards from the longitudinally central portion of the under surface of the third guide member 58. The under surface of the first engaged projection 64 is downwardly convexed to have a curved face. A recess having a downwardly-convexed bottom is formed on the longitudinally central portion of the upper surface of the third guide member 58. Thanks to this recess, the first engaged projection 64 is able to easily and resiliently bend up and down along the second outer surface 46.

The held means 62 also has a second engaged projection 66 projected upwards from the longitudinally central portion of the upper surface of the fourth guide member 60. The upper surface of the second engaged projection 66 is upwardly convexed to have a curved face. A recess having an upwardly-convexed bottom is formed on the longitudinally central portion of the under surface of the fourth guide member 60. Thanks to this recess, the second engaged projection 66 is able to easily resiliently bend up and down along the second outer surface 46.

FIG. 3 shows an accessory 70, a first embodiment of the present invention. The accessory 70 has an accessory body 74 provided with a space 72 in which various articles such as an earphone, head cleaner and connection code belonging to the tape recorder are housed. The accessory body 74 is a rectangular parallelepiped. The space 72 is opened both at upper and right side faces of the accessory body 74 and the opening on the upper side is continuous to the one on the right side. A movable member 76 is attached to the accessory body 74 by means of a well-known means. The well-known means represents the combination of pins and holes or the push fitting portion formed between the movable member 76 and the accessory body 74 when these are formed integrally each other by injection molding using resilient synthetic resin. The movable member 76 has a rotating center line 78 crossing front and back end faces of the accessory body 74. The movable member 76 forms upper and right sides of the accessory body 74 and is freely swingable around the center line 78 from a first position at which the opening of space 72 is closed to a second position shown in FIG. 3 and vice versa. When the movable member 76 is in the second position, articles belonging to the tape recorder can be housed or held in the space 72 of the accessory body 74, or these articles already housed or held in the space 72 can be taken out of the space 72. When the movable member 76 is in the first position and articles are held in the space 72 of the accessory body 74, these articles are under the condition of their being housed by the movable member 76 in the accessory body 74.

A left side face 80 of the accessory body 74 has a longitudinal length two times that of first outer surface 22 of tape-cassette storage box 10. Namely, the left side face of accessory body 74 is about 102 mm long in a longitudinal direction. A first engaging means 24 and a holding means 38 are arranged on each of those two portions of left side face 80 which correspond to two first outer surfaces 22 of the tape-cassette storage box 10. The relation of first engaging means 24 and holding means 38 relative to the left side face 80 is same as that of first engaging means 24 and holding means 38 of the tape-cassette storage box 10 relative to the first outer surface 22. Therefore, elements forming the first engaging means 24 and holding means 38 of the accessory 70 are represented by same reference numerals as those representing their corresponding elements of first engaging means 24 and holding means 38 of the tape-cassette storage box 10, and description on these elements is omitted.

Figure 5:
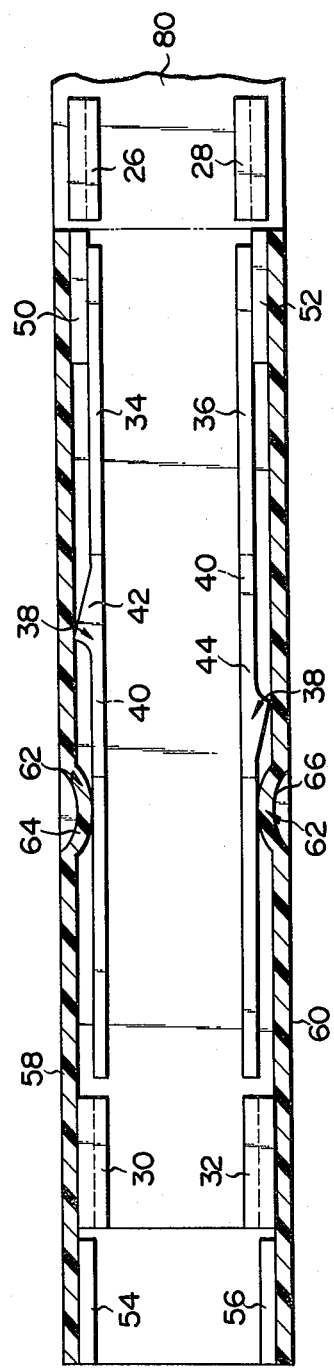
FIG. 5 is a sectional view taken along a line V—V in FIG. 4.

The second outer surface 46 of the tape-cassette storage box 10 is now opposed to the back half of the left side face 80 of the accessory 70. The first engaged claw 50 of second engaging means 48 of the tape-cassette storage box 10 is positioned on a portion of the upper surface of the first guide member 34 which is located just after the first engaging claw 26 of back half of the accessory 70. At the same time, the second engaged claw 52 of second engaging means 48 of the tape-cassette storage box 10 is positioned on a portion of the lower surface of the second guide member 36 which is located just after the second engaging claw 28 of back half of the accessory 70, as shown in FIGS. 4 and 5.

The tape-cassette storage box 10 is then moved forwards along the left side face 80 of the accessory 70 in a direction shown by an arrow A in FIG. 4. The first engaged claw 50 of second engaging means 48 of the tape-cassette storage box 10 slides on the upper face of the first guide member 34 of the accessory 70 while the second engaged claw 52 slides on the under face of the second guide member 36 of the accessory 70, thus allowing the tape-cassette storage box 10 to be guided along the left side face 80 of the accessory 70.

The upper face of the second engaged projection 66 of the held means 62 of the tape-cassette storage box 10 moved is slidably contacted with the inclined under face of the second stopper 44 of the holding means 38 of the accessory 70 to urgingly curve the second stopper 44 upwards. The projected end portion of each of first-to-fourth engaging claws 26, 28, 30 and 32 of the first engaging means 24 arranged on the back half of the left side face 80 of the accessory 70 is engaged this time with that of each of first-to-fourth engaged claws 50, 52, 54 and 56 of the second engaging means 48 on the tape-cassette storage box 10.

Figure 7:
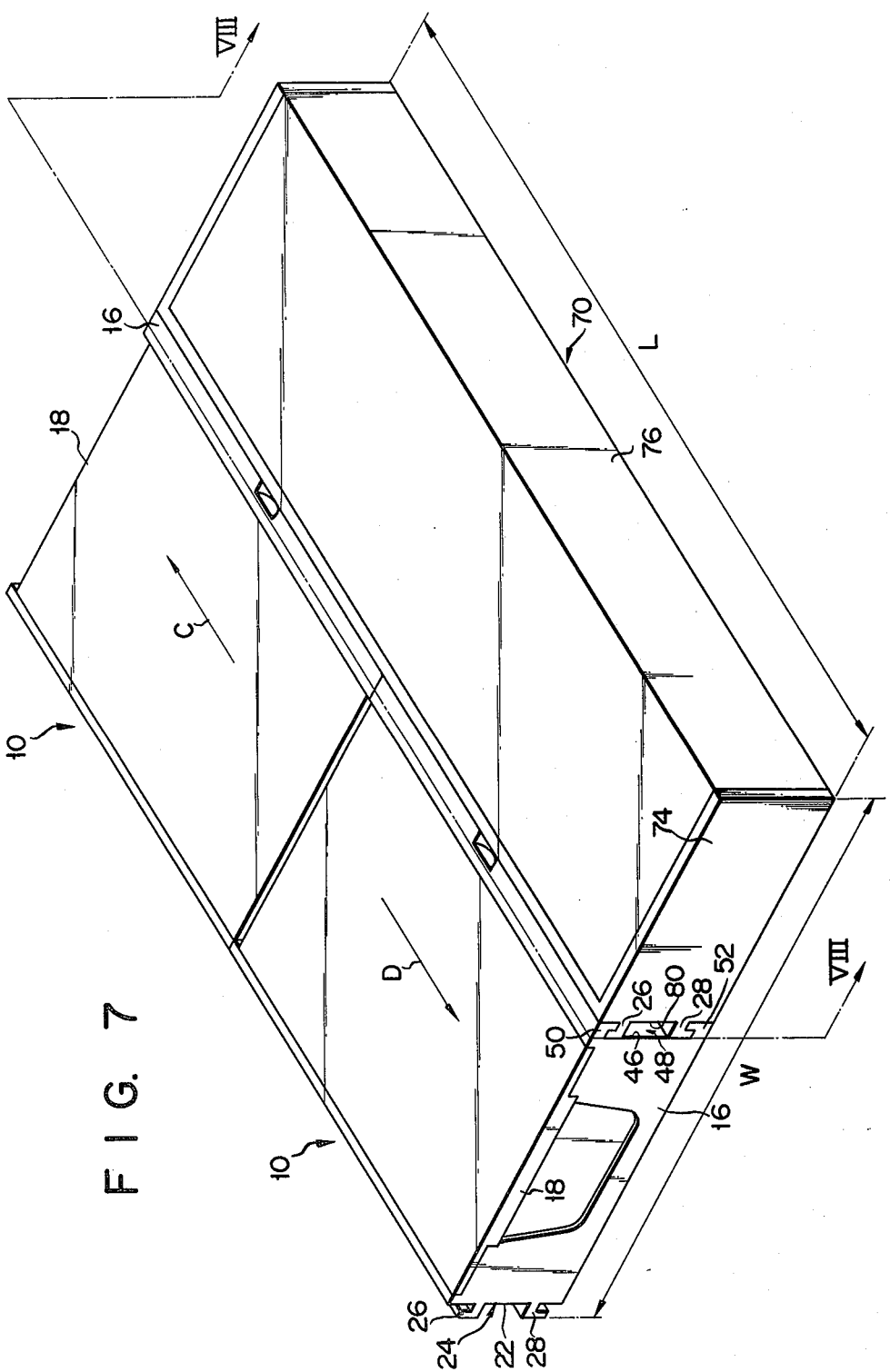
FIG. 7 is a perspective view showing the condition under which the second engaging means of the tape-cassette storage box shown in FIG. 1 is engaged with each of first engaging means on the left side face of the accessory according to the first embodiment of the present invention.
Figure 8:
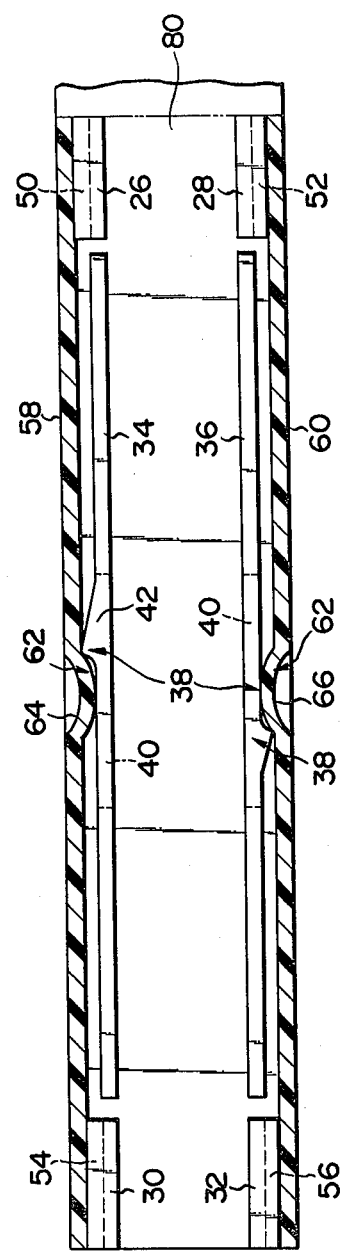
FIG. 8 is a sectional view taken along a line VIII—VIII in FIG. 7 and showing only the back half of the accessory.

When the back end face (or outer surface crossing perpendicular to first and second outer surfaces 22 and 46) of the tape-cassette storage box 10 is positioned in a same plane including the back end face (or outer surface crossing perpendicular to the left side face 80) of the accessory 70, as shown in FIG. 7, the first engaged projection 64 of the held means 62 on the tape-cassette storage box 10 is contacted with the curved face of the first stopper 42 of the holding means 38 on the back half of the left side face 80 of the accessory 70, and the second engaged projection 66 of the held means 62 on the tape-cassette storage box 10 is contacted with the curved face of the second stopper 44 of the holding means 38 on the accessory 70, as shown in FIG. 8.

The upper face (or outer surface crossing substantially perpendicular to first and second outer surfaces 22 and 46) of the tape-cassette storage box 10 is positioned this time in a same plane including the upper face (or outer surface crossing substantially perpendicular to the left side face 80) of the accessory 70, as shown in FIGS. 7 and 8, and the under surface (or outer surface crossing substantially perpendicular to first and second outer surfaces 22 and 46) of the tape-cassette storage box 10 is also positioned in a same plane including the under surface (or outer surface crossing substantially perpendicular to the left side face 80) of the accessory 70, as shown in FIG. 8.

The second engaging means 48 of another tape-cassette storage box 10 can also be similarly engaged with the first engaging means 24 arranged on a front half of the left side face 80 of the accessory 70. The third engaged claw 54 of the second engaging means 48 on the tape-cassette storage box 10 is positioned on a part of the upper surface of the first guide member 34 which is located just before the third engaging claw 30 of the front half of the accessory 70 while the fourth engaged claw 56 of the second engaging means 48 on the tape-cassette storage box 10 is positioned on a part of the lower surface of the second guide member 36 which is located just before the fourth engaged claw 32 of the front half of the accessory 70.

The tape-cassette storage box 10 is then moved in a direction shown by an arrow B in FIG. 4. The under surface of the first engaged projection 64 of the held means 62 on the tape-cassette storage box 10 moved is slidably contacted with the inclined upper face of the first stopper 42 of the holding means 38 on the accessory 70 to forcedly curve the first stopper 42 downwards. When the front end face (or outer surface crossing substantially perpendicular to the left side face 80) of the accessory 70 is then positioned in a same plane including the front end face (or outer surface crossing substantially perpendicular to first and second outer surfaces 22 and 46) of the tape-cassette storage box 10, as shown in FIG. 7, first-to-fourth engaging claws 26, 28, 30 and 32 of the first engaging means 24 on the front half of the left side face 80 of the accessory 70 engage with first-to-fourth engaged claws 50, 52, 54 and 56 of the second engaging means on the tape-cassette storage box 10, and the holding means 38 on the front half of the left side face 80 of the accessory 70 comes to hold the held means 62 on the tape-cassette storage box 10.

Figure 9:
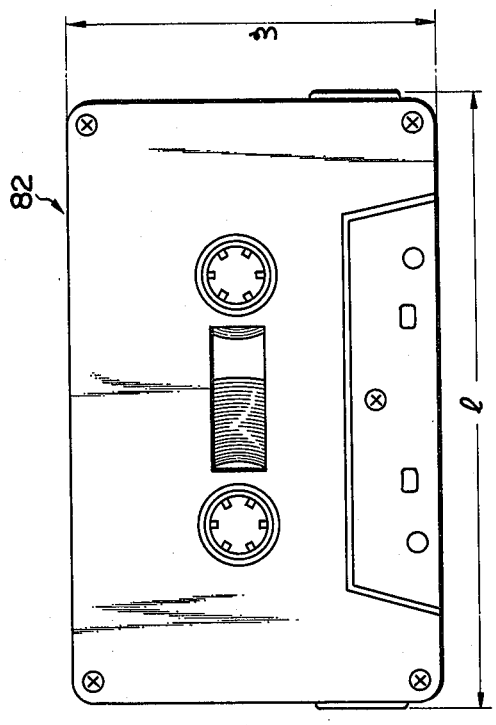
FIG. 9 is a plan view showing a compact tape cassette.

When second engaging means 48 on two tape-cassette storage boxes 10 are respectively engaged with first engaging means 48 on front and back halves of the left side face 80 of the accessory 70 as shown in FIG. 7, the distance L from the front end face of the accessory 70 to the back end face thereof (or from the front end face of a tape-cassette storage box 10 positioned corresponding to the front half of the accessory to the back end face of another tape-cassette storage box 10 positioned corresponding to the back half of the accessory) is about 102 mm. This distance L is equal to the longitudinal length l of a housing of a compact tape cassette 82 developed by Philips Co. and shown in FIG. 9. Another distance W extending from the right side face of the accessory 70 to the left end of any of first-to-fourth engaging claws 26, 28, 30 and 32 on the first outer surface 22 of the tape-cassette storage box 10 is about 63.5 mm. This distance W is equal to the width w of the housing of the compact tape cassette 82 shown in FIG. 9. The movable member 76 of the accessory 70 shown in FIG. 7 is in the first position.

Figure 6:
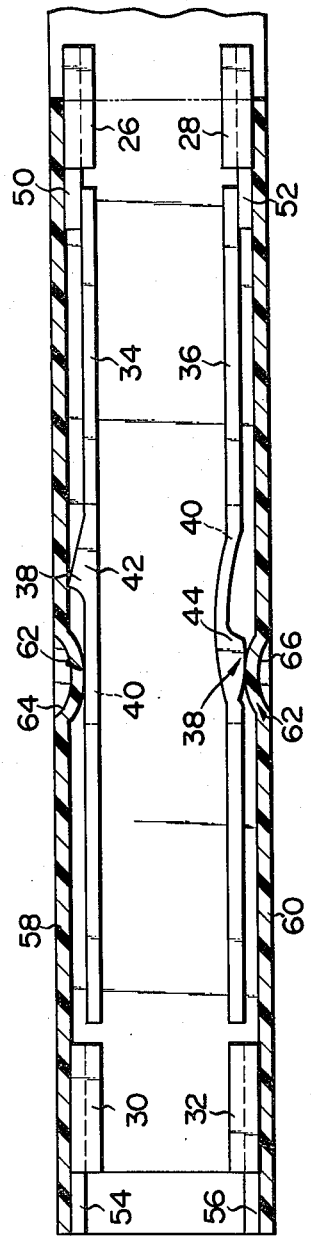
FIG. 6 is a sectional view similar to FIG. 5 showing how the second engaging means of the tape-cassette storage box is engaged with the first engaging means on the back half of the left side face of the accessory according to the first embodiment of the present invention.

When the tape-cassette storage box 10 engaged with the first engaging means 24 on the back half of the left side face 80 of the accessory 70 is drawn in a direction shown by an arrow C in FIG. 7 by a force larger than a predetermined value, the second engaged projection 66 of the held means 62 on the tape-cassette storage box 10 causes the second stopper 44 of the holding means 38 on the accessory 70 to be resiliently deformed upwards and the held means 62 on the back half of the left side face 80 of the accessory 70 is released. The tape-cassette storage box 10 can be thus moved backward along the left side face 80 of the accessory 70. The tape-cassette storage box 10 is moved by the length of the first engaging claw 26, then passed through processes shown in FIGS. 8, 6 and 5 in this order, and finally released from the accessory 70.

When another tape-cassette storage box 10 engaged with the first engaging means 24 on the front half of the left side face 80 of the accessory 70 is drawn in a direction shown by an arrow D in FIG. 7 by a force larger than the predetermined value, the first engaged projection 64 of the held means 62 on the tape-cassette storage box 10 causes the first stopper 42 of the holding means 38 on the accessory 70 to be resiliently deformed downwards, and the held means 62 of the tape-cassette storage box 10 is then released from the holding means 38 on the front half of the left side face 80 of the accessory 70. When the tape-cassette storage box 10 is further moved only by the length of the first engaging claw 26, it can be released from the accessory 70 as shown in FIG. 4.

Figure 10:
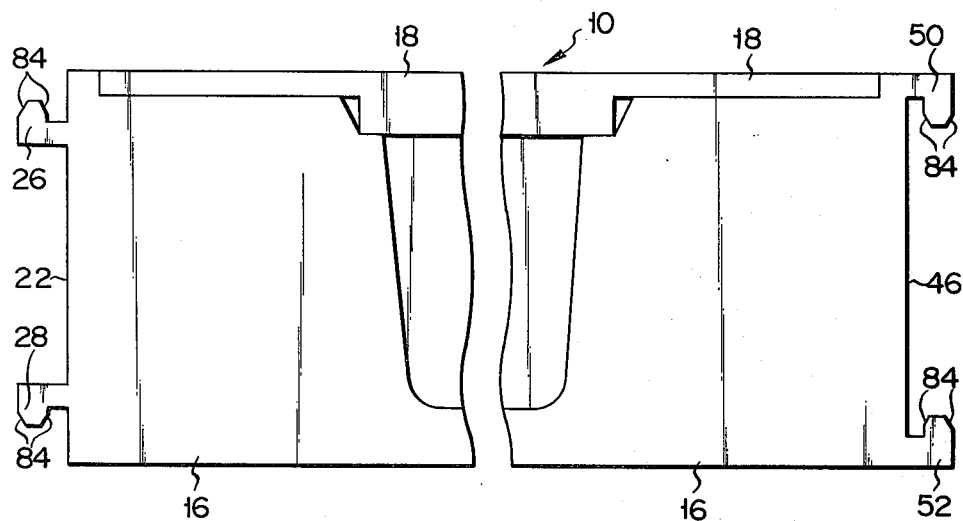
FIG. 10 is a front view showing the enlarged front end face of the tape-cassette storage box shown in FIG. 1.

A pair of chamfers 84 are formed at the projected front end of each of first-to-fourth engaging claws 26, 28, 30, 32 of the first engaging means 24 and first-to-fourth engaged claws 50, 52, 54, 56 of the second engaging means 48, as shown in FIG. 10, in the direction in which first-to-fourth engaging claws 26, 28, 30, 32 are engaged with first-to-fourth engaged claws 50, 52, 54, 56.

Figure 12:
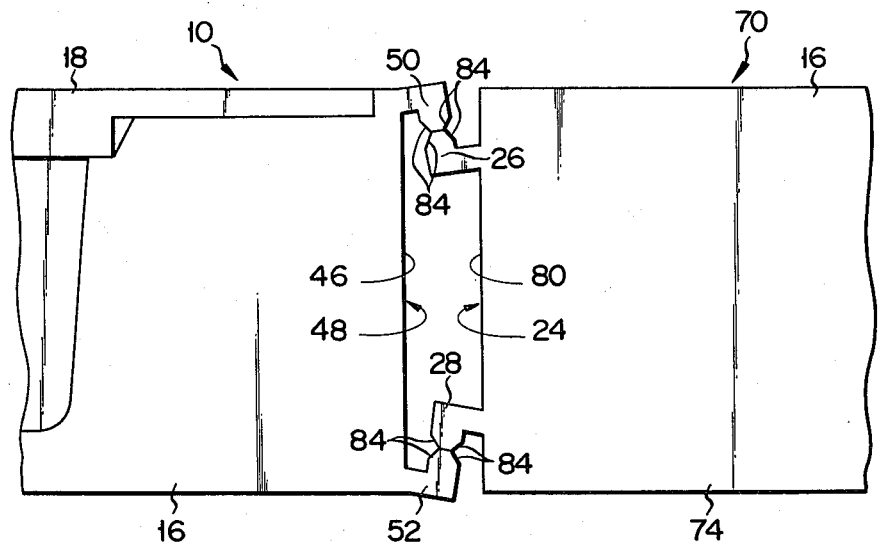
FIG. 12 is a front view showing the condition under which the tape-cassette storage box is pushed against the accessory in a direction in which the right side face of the tape-cassette storage box shown in FIG. 11 comes nearer the left side face of the accessory shown in FIG. 11.

Therefore, when the outer chamfer 84 of each of first-to-fourth engaged claws 50, 52, 54, 56 of the second engaging means 48 on the tape-cassette storage box 10 is contacted with that of each of first-to-fourth engaging claws 26, 28, 30, 32 of the first engaging means 24 on the accessory 70 and the tape-cassette storage box 10 is then pushed in a direction in which the second outer surface 46 of the tape-cassette storage box 10 comes nearer to the left side face 80 of the accessory 70, first and second engaged claws 50 and 52 of the second engaging means 48 on the tape-cassette storage box 10 are deformed departing from each other as shown in FIG. 12.

Third and fourth engaged claws 54 and 56 of the second engaging means 48 on the tape-cassette storage box 10 are also deformed departing from each other.

First and second engaging claws 26 and 28 of the first engaging means 24 on the accessory 70 are deformed approaching each other as shown in FIG. 12.

Third and fourth engaging claws 30 and 32 of the first engaging means 24 on the accessory 70 are also deformed approaching each other.

Figure 13:
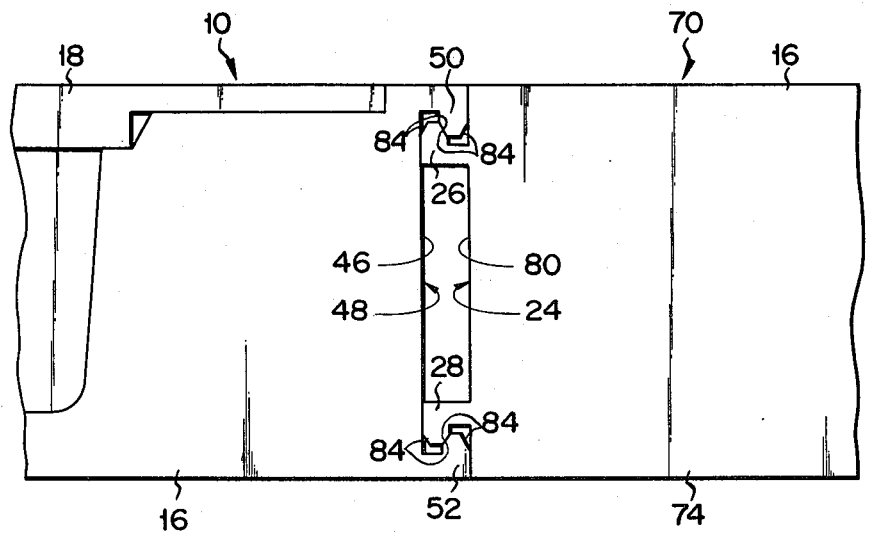
FIG. 13 is a front view showing the condition under which first and second engaged claws of second engaging means on the right side face of the tape-cassette storage box are engaged with first and second engaging claws of first engaging means on the left side face of the accessory.

When the second outer surface 46 of the tape-cassette storage box 10 comes further nearer to the left side face 80 of the accessory 70, first-to-fourth engaged claws 50, 52, 54, 56 of the second engaging means 48 on the tape-cassette storage box 10 are engaged with first-to-fourth engaging claws 26, 28, 30, 32 of the first engaging means 24 on the accessory 70, as shown in FIG. 13.

The inner chamfer 84 of each of first-to-fourth engaging claws 26, 28, 30, 32 of the first engaging means 24 on the accessory 70 is contacted this time with that of each of first-to-fourth engaged claws 50, 52, 54, 56 of the second engaging means 48 on the tape-cassette storage box 10 as shown in FIG. 13.

Figure 11:
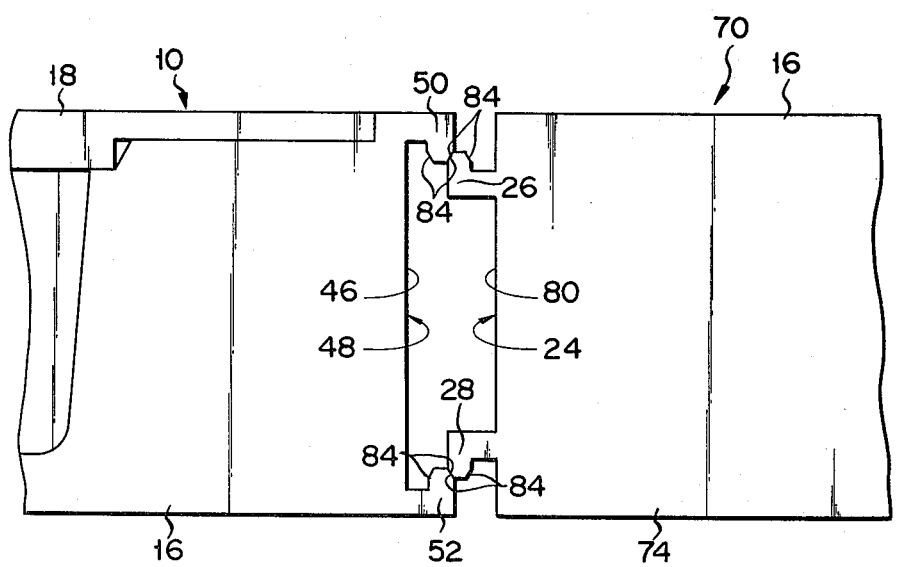
FIG. 11 is a front view showing the condition under which the chamfer of each of first and second engaged claws of second engaging means on the right side face of the tape-cassette storage box is contacted with that of each of first and second engaging claws of first engaging means on the left side face of the accessory.

The second engaging means 48 of the tape-cassette storage box 10 can be released from the first engaging means 24 of the accessory 70 when subjected to processes shown in FIGS. 13, 12 and 11 in this order.

FIGS. 14 through 17 show a second embodiment of the present invention, in which same parts as those of the first embodiment are represented by the same reference numerals and description on these parts will be omitted.

First and third engaging claws 26 and 30 of the first engaging means 24 are continuous from each other through the first guide member 34 and second and fourth engaging claws 28 and 32 thereof are also continuous from each other through the second guide member 36, as shown in FIG. 14.

The holding means 38 has a pair of projections 86 and 88 projected downwards from the longitudinally central portion of the under surface of the second guide member 36, as shown in FIG. 14.

The held means 62 has a first engaged projection 90 projected downwards from the longitudinally central portion of the under surface of the third guide member 58 and a second engaged projection 92 projected upwards from the longitudinally central portion of the upper surface of the fourth guide member 60, as shown in FIG. 15.

The second outer surface 46 of the tape-cassette storage box 10 is opposed to the back half of the left side face 80 of the accessory 70. The first engaged claw 50 of the second engaging means 48 on the tape-cassette storage box 10 is then positioned on a portion of the upper surface of the first guide member 34 which is located just after the first engaging claw 26 arranged on the back end of the accessory 70 while the second engaged claw 52 of the second engaging means 48 on the tape-cassette storage box 10 is positioned on a portion of the lower surface of the second guide member 36 which is located just after the second engaging claw 28 arranged on the back end of accessory 70 as shown in FIG. 16.

Figure 16:
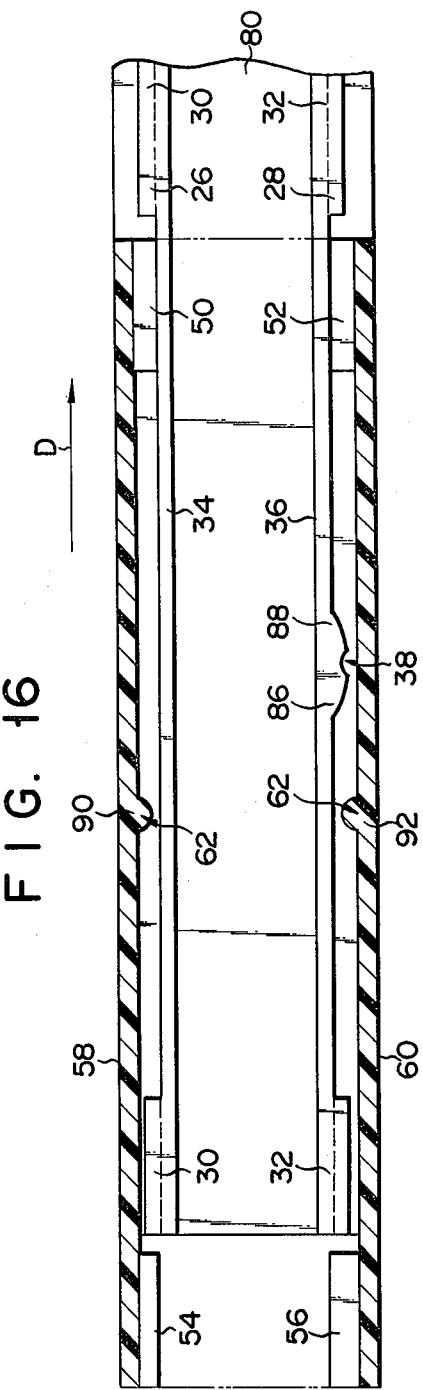
FIG. 16 is a sectional view similar to FIG. 5 and showing the condition under which the second engaging means on the tape-cassette storage box is just to be engaged with the first engaging means on the back half of the left side face of accessory according to the second embodiment of the present invention.

The tape-cassette storage box 10 is forwarded along the left side face 80 of the accessory 70 in a direction shown by an arrow D in FIG. 16. The first engaged claw 50 of the second engaging means 48 on the tape-cassette storage box 10 is slidably contacted with the upper face of the first guide member 34 on the accessory 70 and the second engaging claw 52 of the tape-cassette storage box 10 is slidably contacted with the under face of the second guide member 36 of the accessory 70, thus enabling the tape-cassette storage box 10 to be guided along the accessory 70.

The second engaged projection 92 of the held means 62 on the tape-cassette storage box 10 moved is contacted with the upper face of the back side projection 86 of the holding means 38 on the back half of the left side face 80 of the accessory 70, causing the projection 86 to be curved upwards. The projected end portion of each of first-to-fourth engaging claws 26, 28, 30, 32 of the first engaging means 24 on the tape-cassette storage box 10 is engaged at the same time with that of each of first-to-fourth engaged claws 50, 52, 54, 56 of second engaging means 48 on the tape-cassette storage box 10.

Figure 17:
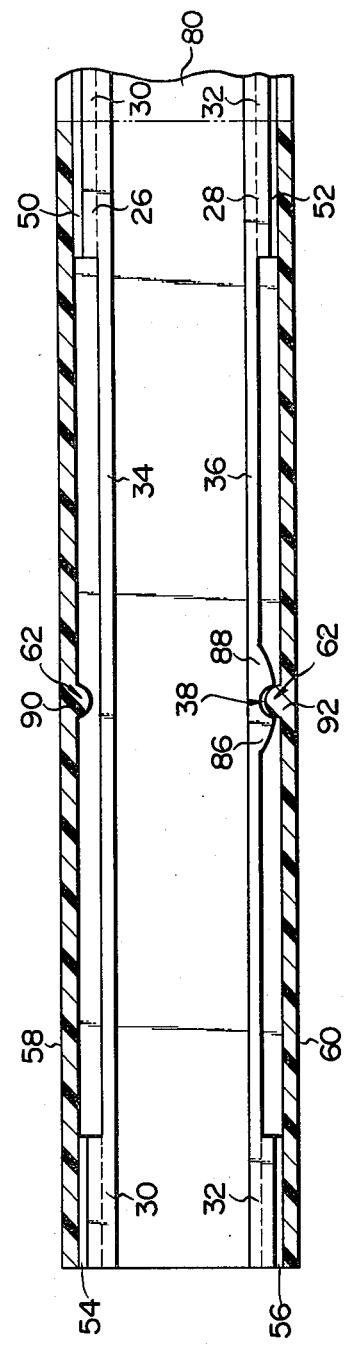
FIG. 17 is a sectional view similar to FIG. 5 and showing the condition under which the second engaging means on the tape-cassette storage box is engaged with the first engaging means on the back half of left side face of accessory according to the second embodiment of the present invention.

When the back end face of the tape-cassette storage box 10 is positioned on a same plane including that of the accessory 70, as shown in FIG. 17, the second engaged projection 92 of the held means 62 on the tape-cassette storage box 10 is held between the pair of projections 86 and 88 of the holding means 38 on the back half of the left side face 80 of the accessory 70.

The upper face of the tape-cassette storage box 10 is this time in a same plane including that of the accessory 70 and the under face of the former in a same plane including that of the latter, as shown in FIG. 17.

The second engaging means 48 of the another tape-cassette cassette storage box 10 can be similarly engaged with the first engaging means 24 on the front half of the left side face 80 of the accessory 70. The third engaged claw 54 of the second engaging means 48 on the another tape-cassette storage box 10 is positioned on a portion of the upper surface of the first guide member 34 which is located just before the third engaging claw 30 arranged on the front end side of the accessory 70 and the fourth engaged claw 56 of the second engaging means 48 on the another tape-cassette storage box 10 at the same time is positioned on a portion of the lower surface of the second guide member 36 which is located just before the fourth engaged claw 32 arranged on the front end side of the accessory 70.

Another tape-cassette storage box 10 is then forwarded along the left side face 80 of the accessory 70 and toward the back end of the accessory 70, thus allowing the second engaging means 48 of the another tape-cassette storage box 10 to be engaged with the first engaging means 24 on the front half of left side face 80 of the accessory 70 and also allowing the held means 62 of the another tape-cassette storage box 10 to be held by the holding means 38 of the accessory 70.

The condition under which second engaging means 48 of the tape-cassette storage boxes 10 according to the second embodiment of the present invention are engaged with first engaging means 24 on front and back halves of the left side face 80 of the accessory 70 according to the second embodiment of the present invention is same as that in the first embodiment of the present invention shown in FIG. 7. Therefore, the distance L from the front end face to the back end face of the accessory according to the second embodiment of the present invention (or from the front end face of the tape-cassette storage box 10 corresponding to the front half of the accessory 70 to the back end face of the another tape-cassette storage box corresponding to the back half of the accessory 70) is about 102 mm. The distance W from the right side face of the accessory 70 to the left end of any of first-to-fourth engaging claws 26, 28, 30, 32 on the first outer surface 22 of one of tape-cassette storage boxes 10 is about 63.5 mm.

When the tape-cassette storage box 10 whose second engaging means 48 is engaged with the first engaging means 24 on the back half of the left side face 80 of the accessory 70 receives a force larger than the predetermined value in the left in FIG. 17 and is moved only by the length of first engaging claw 26, the second engaging means 48 thereof is released from the first engaging means 24 on the back half of the left side face 80 of the accessory 70.

When the tape-cassette storage box 10 whose second engaging means 48 is engaged with the first engaging means 24 on the front half of the left side face 80 of the accessory 70 receives a force larger than the predetermined value in the direction of its moving toward the front end of the left side face 80 of the accessory 70 and is moved only by the length of the first engaging claw 26, the second engaging means 48 thereof is released from the first engaging means 24 on the front half of the left side face 80 of the accessory 70.

According to this invention, there is provided an accessory for a tape cassette storage box including a box body for storing a micro-cassette, a cover member attached to the box body and freely swingable between a first position at which the cover member cooperates with the box body to house the micro-cassette in the box body and a second position at which the cover member allows the micro-cassette to be housed in and taken out of the box body, a first outer surface formed on the box body, a second outer surface formed on the box body and parallel to the first outer surface, a first engaging means arranged on the first outer surface, and a second engaging means arranged on the second outer surface, characterized in that said accessory comprises:

an accessory body having a space in which articles are held;

an outer surface portion on which at least one of first and second engaging means is arranged; and a movable member attached to the accessory body and freely swingable between a first position at which the movable member cooperates with the accessory body to house said articles in the accessory body and a second position at which the movable member allows said articles to be housed in and taken out of the accessory body.

With such arrangement, time and labor necessary to take out before a user various articles belonging to the tape recorder just before they are practically used can be reduced. In addition, a fear that these various articles are left and lost anywhere can be eliminated.

The accessory for tape-cassette storage box of the invention may be so constructed that the outer surface portion of the accessory is formed to have same shape and dimension as those of the first or second outer surface of the box body; the first or second engaging means is arranged on the outer surface portion; and when the first or second engaging means on the outer surface portion is engaged with the second or first engaging means on the tape-cassette storage box, a plurality of outer faces of the accessory crossing the outer surface portion thereof are positioned in the same planes including those of the tape-cassette storage box crossing the first or second outer surface thereof.

Preferably, in the accessory for the tape-cassette storage box of the invention, each of the first and second outer surfaces of the box body is about 51 mm long in a longitudinal direction thereof; the outer surface portion of the accessory has same shape and dimension as those of the box bodies obtained when two of the first or second outer surface of each of the box body are made continuous from each other in the longitudinal direction thereof; the first engaging means is arranged on each of those portions of the outer surface portion each of which correspond to the first or second outer surface of the box body; and when each of two first engaging means on the outer surface portion is engaged with the second engaging means of the tape-cassette storage body, a plurality of outer faces of the accessory crossing the outer surface portion thereof are positioned in the same planes including those of the box body crossing the first and second outer surfaces thereof.

A unit of tape-cassette housing cases and accessory engaged with these tape-cassette storage boxes can be applied to any of various cassette racks available to classify and arrange compact tape cassettes of Philips type.

Preferably, in an accessory for the tape-cassette storage box, the accessory has another outer surface portion parallel to the outer surface portion and the distance from the outer surface portion to the another surface portion is determined in such a way that the distance from the another outer surface portion of the accessory to the first outer surface of the tape-cassette storage box becomes about 63.5 mm when the second engaging means of the tape-cassette storage box is engaged with the first engaging means of said accessory.

The unit can be easily fitted into and detached from the cassette rack.

In order to obtain such two advantages described above, the accessory for the tape-cassette storage box may be so constructed that each of first and second outer surfaces of the box body is about 51 mm long in a longitudinal direction thereof; the outer surface portion of the accessory has same shape and dimension as those of box bodies obtained when two of the first or second outer surface of the box body are made continuous from each other; the second engaging means is arranged on each of those portions of the outer surface portion each of which correspond to the first or second outer surface of the box body; and when each of the two second engaging means on the outer surface portion is engaged with the first engaging means of the tape-cassette storage box, a plurality outer faces of the accessory crossing the outer surface portion thereof are positioned in the same planes including those of the box body crossing the first and second outer surfaces thereof.

And also the accessory for the tape-cassette storage box may be so constructed that the accessory has another outer surface portion parallel to the outer surface portion and the distance from the outer surface portion to the another outer surface portion is determined in such a way that the distance from the another outer surface portion of the accessory to the second outer surface of the tape-cassette storage box becomes about 63.5 mm when the second engaging means of the accessory is engaged with the first engaging means of the tape-cassette storage box.

Preferably, in the accessory for the tape-cassette storage box, the movable member has a center line crossing the outer surface portion and is swingable around the center line between the first and second positions.

With such arrangement, the distance between which the movable member is swingable is made relatively small, so that articles can be easily put in and taken out of space in the accessory body.

In order to obtain the advantage described above, the accessory for the tape-cassette storage box may be so constructed that the movable member has a center line crossing two other outer faces which cross the outer surface portion, and is swingable around the center line between first and second positions.

Preferably, in the accessory for the tape-cassette storage box, said outer surface portion is of rectangular shape and the first and second outer surfaces are also of rectangular shape respectively;

the first engaging means includes a first engaging claw arranged at a first corner on the first outer surface or the outer surface portion, a second engaging claw arranged at such a second corner on said first outer surface or the outer surface portion that is spaced from the first engaging claw in a direction substantially perpendicular to the direction in which the first engaging claw is engaged and having same engaging direction and length as those of the first engaging claw, a third engaging claw arranged at a third corner on said first outer surface or the outer surface portion that is spaced from the first engaging claw in the direction in which the first engaging claw is engaged and having same engaging direction and length as those of the first engaging claw, and a fourth engaging claw arranged at a fourth corner on the first outer surface or said outer surface portion that is spaced from the third engaging claw in a direction substantially perpendicular to the direction in which the third engaging claw is engaged and also spaced from the second engaging claw in the direction in which the second engaging claw is engaged and having same engaging direction and length as those of the first engaging claw;

the second engaging means includes a first engaged claw arranged at a first corner on the second outer surface or the outer surface portion, a second engaged claw arranged at such a second corner on the second outer surface that is, spaced from the first engaged claw in a direction substantially perpendicular to the direction in which the first engaged claw is engaged and having same engaging direction and length as those of first engaged claw, a third engaged claw arranged at a third corner on the second outer surface or the outer surface portion that is spaced from the first engaged claw in the direction in which the first engaged claw is engaged and having same engaging direction and length as those of the first engaged claw, and a fourth engaged claw arranged at a fourth corner on the second outer surface that is spaced from the third engaged claws in a direction substantially perpendicular to the direction in which the third engaged claw is engaged and also spaced from the second engaged claw in the direction in which the second engaged claw is engaged and having same engaging direction and length as those of the first engaged claw; and when the first engaging means on the tape-cassette storage box or accessory is engaged with the second engaging means on the accessory or the tape-cassette storage box, the first-to-fourth engaging claws of the first engaging means are engaged with the first-to-fourth engaged claws of the second engaging means.

With such arrangement, engagement and release between the first or second engaging means of the accessory and the second or first engaging means of the tape-cassette storage box can be easily achieved only by moving the tape-cassette storage box along the outer surface of the accessory by the length of the first engaging claw of the first engaging means.

Preferably, in the accessory for the tape-cassette storage box, the first and third engaging claws of the first engaging means are projected from the first outer surface or the outer surface portion in a direction substantially perpendicular to the first outer surface or the outer surface portion and then bent at their projected ends substantially parallel to the first outer surface or the outer surface portion and in the direction of their departing from the second and fourth engaging claws; the second and fourth engaging claws of the first engaging means are projected from the first outer surface or the outer surface portion substantially perpendicular to the first outer surface or the outer surface portion and then bent at their projected ends substantially parallel to the first outer surface or the outer surface portion and in the direction of their departing from the first and third engaging claws; the first and third engaged claws of the second engaging means are projected from the second outer surface or the outer surface portion substantially perpendicular to the second outer surface or the outer surface portion and then bent at their projected ends substantially parallel to the second outer surface or the outer surface portion and in the direction of their approaching the second and fourth engaged claws; and the second and fourth engaged claws of the second engaging means are projected from the second outer surface or the outer surface portion substantially perpendicular to the second outer surface or the outer surface portion and then bent at their projected ends substantially parallel to the second outer surface or the outer surface portion and in the direction of their approaching the first and third engaged claws.

With such construction, first-to-fourth engaging claws of the first engaging means and first-to-fourth engaged claws of the second engaging means can be made simple in construction, thus enabling the manufacturing cost thereof to be reduced.

Preferably, in the accessory for the tape-cassette storage box, the first-to-fourth engaging claws of the first engaging means are made of resilient synthetic resin and molded integral to the first outer surface or the outer surface portion; each of said first-to-fourth engaging claws has chamfers formed at its projected end and along the direction in which it is engaged; the first-to-fourth engaged claws of the second engaging means are made of resilient synthetic resin and molded integral to the second outer surface or the outer surface portion; each of the first-to-fourth engaged claws has chamfers at its projected end and along the direction in which it is engaged; and when the first or second engaging means on the accessory is contacted with the second or first engaging means on the tape-cassette storage box in a direction perpendicular to the direction in which the first and second engaging means are engaged each other, the chamfer of each of the first-to-fourth engaging claws of the first engaging means is contacted with that of each of the first-to-fourth engaged claws of the second engaging means.

With such arrangement, the first or second engaging means of the accessory can also be engaged with the second or first engaging means of the tape-cassette storage box in such a way that the tape-cassette storage box and the accessory are approached each other crossing the direction in which first and second engaging means are slided to engage with each other. In addition, the first or second engaging means of the accessory can also be released from the second or first engaging means of the tape-cassette storage box in such a way that the tape cassette storage box and the accessory are separated from each other crossing the direction in which first and second engaging means are slided to disengage from each other.

Preferably, in the accessory for the tape-cassette storage box, the first engaging means has a holding means; the second engaging means has a held means; and when the first-to-fourth engaging claws of the first engaging means or the first-to-fourth engaged claws of the second engaging means on the tape-cassette storage box are engaged with the first-to-fourth engaged claws of the second engaging means or the first-to-fourth engaging claws of the first engaging means on the accessory, the holding means of the first engaging means comes to hold the held means of the second engaging means and the engagement between the first and second engaging means is kept till a force larger than a predetermined value is applied thereto.

With such arrangement, there is no possibility that engagement between the first or second engaging means of the accessory and the second or first engaging means of the tape-cassette storage box is wrongly or accidentally lost.

Preferably, in the accessory for the tape cassette storage box, the first engaging means has a first guide member arranged between the first and third engaging claws and has a second guide member arranged between the second and fourth engaging claws, and the first and second engaged claws or third and fourth engaged claws of the second engaging means on the tape-cassette storage box or the accessory are guided by the first and second guide members of the first engaging means on the tape-cassette storage box or the accessory causing the first engaging means on the tape-cassette storage box or the accessory to be engaged with the second engaging means on the tape-cassette storage box or the accessory.

With such arrangement, the first or second engaging means of the accessory can be easily engaged with the second or first engaging means of the tape-cassette storage box.

Preferably, in the accessory for the tape-cassette storage box, the first guide member is a band-shaped plate formed on an imaginary line combining the first engaging claw with the third one and projected substantially perpendicular to the first outer surface or the outer surface portion; the second guide member is a band-shaped plate formed on an imaginary line combining the second engaging claw with the fourth one and projected substantially perpendicular to the first outer surface or the outer surface portion; and the projected end face of each of the first and second engaged claws or third and fourth engaged claws of said second engaging means on the accessory or the tape-cassette storage box is slidably contacted with the first and second guide members of said first engaging means on the tape-cassette storage box or the accessory causing the first-to-fourth engaged claws of said second engaging means on the accessory or the tape-cassette storage box to be engaged with the first-to-fourth engaging claws of said first engaging means on the tape-cassette storage box or the accessory.

With such arrangement, the construction of each of the first and second guide members become more simple, manufacturing of the first and second guide members become more easy.

Preferably, in the accessory for the tape-cassette storage box, the second engaging means includes a third guide member of band shape formed on the second outer surface or the outer surface portion along an imaginary line combining the first engaged claw with the third one and projected substantially perpendicular to the second outer surface or the outer surface portion, and a fourth guide member of band shape formed on the second outer surface or the outer surface portion along an imaginary line combining the second engaged claw with the fourth one and projected substantially perpendicular to the second surface or the outer surface portion; the holding means of the first engaging means includes openings each formed in the center of the longitudinal direction of each of the first and second guide members and serving to separate the center portion of each of the first and second guide members from the first outer surface or the outer surface portion, a first stopper formed in the center of the longitudinal direction of the first guide member and nearer the first engaging claw and projected in the same direction as the ends of the first and third engaging claws are projected, and a second stopper formed in the center of the longitudinal direction of the second guide member and nearer the fourth engaging claw and projected in the same direction as the ends of the second and fourth engaging claws are projected; the held means of the second engaging means includes a first engaged projection formed in the center of the longitudinal direction of the third guide member and projected in the same direction as the ends of the first and third engaged claws are projected, and a second engaged projection formed in the center of the longitudinal direction of the fourth guide member and projected in the same direction as the ends of the second and fourth engaged claws are projected; and when the first-to-fourth engaging claws of the first engaging means on the accessory or the tape-cassette storage box are engaged with the first-to-fourth engaged claws of the second engaging means on the tape-cassette storage box or the accessory, the first and second stoppers of the first engaging means on the accessory or the tape-cassette storage box are contacted with the first and second engaged projections of the second engaging means on the tape-cassette storage box or the accessory and the engagement between the first engaging means on the accessory or the tape-cassette storage box and the second engaging means on the tape-cassette storage box or the accessory is maintained till a force larger than the predetermined value is applied thereto.

With such arrangement, construction of each of the holding device and the held device becomes more simple, and the manufacturing of the holding and held devices becomes more easy.

Preferably, in the accessory of the tape-cassette storage box, the first and second engaged projections of the held means of the second engaging means are made hollow.

With such arrangement, holding and held means can be made simple in construction and operated smoothly.

The accessory for the tape-cassette storage box may be so constructed that the second engaging means includes a third guide member of band shape formed on the second outer surface of the outer surface portion along an imaginary line combining the first engaged claw with the third one and projected substantially perpendicular to the second outer surface or the outer surface portion, and a fourth guide member of band shape formed on the second outer surface or the outer surface portion along an imaginary line combining the second engaged claw with the fourth one and projected substantially perpendicular to the second outer surface or the outer surface portion; the holding means of the first engaging means has a pair of projections arranged in the center of the longitudinal direction of the first and second guide members and along the direction in which the first and second guide members guided; the held means of the second engaging means has a projection arranged in the center of the longitudinal direction of the third and fourth guide members; and when the first-to-fourth engaging claws of the first engaging means on the accessory or the tape-cassette storage box are engaged with the first-to-fourth engaged claws of the second engaging means on the tape-cassette storage box or the accessory, at least one of the pair of projections on the holding means of the first engaging means comes to hold at least one of projections on the third and fourth guide members of the second engaging means to keep the first engaging means on the accessory or the tape-cassette storage box engaged with the second engaging means on the tape-cassette storage box or the accessory till a force larger than the predetermined value is applied thereto.

It should be understood that the present invention is not limited to embodiments as described above and that any changes and modifications not departing from the scope of the present invention are included in claims appended hereto.

As shown in FIG. 18, for example, the left side face 80 of the accessory 70 is formed to have same shape and dimension as those obtained when two second outer surfaces 46 of the tape-cassette storage boxes 10 are made continuous from each other in the longitudinal direction thereof, and the length L of the left side face 80 of the accessory 70 is made about 102 mm. A second engaging means 48 and a held means 62 are arranged on each of front and back halves of the left side face 80 of the accessory 70. When the first engaging means 24 of the tape-cassette storage box 10 is engaged with each of two second engaging means 48 arranged on front and back halves of the left side face 80 of the accessory, the distance from the right side face of the accessory 70 to the left end of any of first-to-fourth engaged claws 50, 52, 54, 56 on the second outer surface 46 of one of tape-cassette storage boxes 10 is made about 63.5 mm. The center line 78 around which the movable member 76 of the accessory 70 is swingable crosses front and back end faces of the accessory body 74. When the first engaging means 24 of the tape-cassette storage box 10 is engaged with the second engaging means 48 of the accessory 70, the upper face of the tape-cassette storage box 10 is in a same plane including that of the accessory 70 while the under surface of the former in a same plane including that of the latter.

In the case of the accessory 70 according to the first embodiment of the present invention, the center line 78 around which the movable member 76 is swingable may be crossed left and right side faces of the accessory body 74, as shown in FIG. 19.

In the case of variation shown in FIG. 18, the center line 78 around which the movable member 76 is swingable may be crossed left and right side faces of the accessory body 74, as shown in FIG. 20.

As shown in FIG. 21, for example, the left side face 80 of the accessory 70 is formed to have same shape and dimension as those of the second outer surface 46 of the tape-cassette storage box 10. A second engaging means 48 and a held means 62 are arranged on the left side face 80. When the first engaging means 24 of the tape-cassette storage box 10 is engaged with the second engaging means 48 on the left side face 80 of the accessory 70, the distance from the right side face of the accessory 70 to the left end of any of first-to-fourth engaged claws 50, 52, 54, 56 on the second outer surface 46 of the tape-cassette storage box 10 is made about 63.5 mm. The center line 78 around which the movable member 76 is swingable is crossed front and back end faces of the accessory body 74. The tape-cassette storage box 10 whose first engaging means 24 is engaged with the second engaging means 48 of the accessory 70 is in a same planes including the upper and lower faces of the accessory at upper and lower faces thereof.

As shown in FIG. 22, for example, the left side face 80 of the accessory 70 is formed to have same shape and dimension as those of the first outer surface 22 of the tape-cassette storage box 10. A first engaging means 24 and a holding means 38 are arranged on the left side face 80. With the second engaging means 48 of the tape-cassette storage box 10 is engaged with the first engaging means 24 on the left side face 80 of the accessory 70, the distance from the right side face of the accessory 70 to the left end of any of first-to-fourth engaging claws 26, 28, 30, 32 on the first outer surface 22 of the tape-cassette storage box 10 is made about 63.5 mm. The center line 78 around which the movable member 76 is swingable crosses front and back end faces of the accessory body 74. The tape-cassette storage box 10 whose first engaging means 24 is engaged with the second engaging means 48 of the accessory 70 is in a same plane including the upper and lower faces of the accessory at upper and lower faces thereof.

In the case of variations shown in FIGS. 21 and 22, the center line 78 around which the movable member 76 is swingable may be crossed left and right side faces of the accessory body 74 as shown in FIGS. 23 and 24.

What we claim is:

1. An accessory for a tape-cassette storage box including a box body for storing a micro-cassette, a cover member attached to the box body and freely swingable between a first position in which the cover member cooperates with the box body to house the micro-cassette in the box body and a second position in which the cover member allows the micro-cassette to be housed in and taken out of the box body, a first outer surface formed on the box body, a second outer surface formed on the box body and parallel to the first outer surface, a first engaging means arranged on the first outer surface, and a second engaging means arranged on the second outer surface, said accessory comprising:
    an accessory body having a space in which articles are held;
    an outer surface portion on which at least one of said first and second engaging means is arranged; and
    a movable member attached to the accessory body and freely swingable between a first position in which the movable member cooperates with the accessory body to house said articles in the accessory body and a second position in which the movable member allows said articles to be housed in and taken out of the accessory body;
    said outer surface position being of rectangular shape and said first and second outer surfaces being also of rectangular shape respectively;
    said first engaging means including a first engaging claw arranged at a first corner on said first outer surface or said outer surface portion, a second engaging claw arranged at a second corner on said first outer surface or said outer surface portion which is spaced from the first engaging claw in a direction substantially perpendicular to the direction in which the first engaging claw is engaged and having the same engaging direction and length as those of the first engaging claw, a third engaging claw arranged at a third corner on said first outer surface or said outer surface portion which is spaced from the first engaging claw in the direction in which the first engaging claw is engaged and having the same engaging direction and length as those of the first engaging claw, and a fourth engaging claw arranged at a fourth corner on said first outer surface or said outer surface portion which is spaced from the third engaging claw in a direction substantially perpendicular to the direction in which the third engaging claw is engaged and also spaced from the second engaging claw in the direction in which the second engaging claw is engaged and having the same engaging direction and length as those of the first engaging claw;
    said second engaging means including a first engaged claw arranged at a first corner on said second outer surface or said outer surface portion, a second engaged claw arranged at such a second corner on said second outer surface which is spaced from the first engaged claw in a direction substantially perpendicular to the direction in which the first engaged claw is engaged and having the same engaging direction and length as those of first engaged claw, a third engaged claw arranged at a third corner on said second outer surface or said outer surface portion which is spaced from the first engaged claw in the direction in which the first engaged claw is engaged and having the same engaging direction and length as those of the first engaged claw, and a fourth engaged claw arranged at a fourth corner on said second outer surface which is spaced from the third engaged claw in a direction substantially perpendicular to the direction in which the third engaged claw is engaged and also spaced from the second engaged claw in the direction in which the second engaged claw is engaged and having the same engaging direction and length as those of the first engaged claw; and
    when the first engaging means on said tape-cassette storage box or accessory is engaged with the second engaging means on said accessory or said tape-cassette storage box, the first-to-fourth engaging claws of said first engaging means are engaged with the first-to-fourth engaged claws of said second engaging means.

2. An accessory for the tape-cassette storage box according to claim 1 wherein the first and third engaging claws of said first engaging means are projected from the first outer surface or the outer surface portion in a direction substantially perpendicular to the first outer surface or the outer surface portion and then bent at their projected ends substantially parallel to the first outer surface or the outer surface portion and in the direction of their departing from the second and fourth engaging claws; the second and fourth engaging claws of said first engaging means are projected from the first outer surface or the outer surface portion substantially perpendicular to the first outer surface or the outer surface portion and then bent at their projected ends substantially parallel to the first outer surface or the outer surface portion and in the direction of their departing from the first and third engaging claws; the first and third engaged claws of said second engaging means are projected from the second outer surface or the outer surface portion substantially perpendicular to the second outer surface or the outer surface portion and then bent at their projected ends substantially parallel to the second outer surface or the outer surface portion and in the direction of their approaching the second and fourth engaged claws; and the second and fourth engaged claws of said second engaging means are projected from the second outer surface or the outer surface portion substantially perpendicular to the second outer surface or the outer surface portion and then bent at their projected ends substantially parallel to the second outer surface or the outer surface portion and in the direction of their approaching the first and third engaged claws.

3. An accessory for the tape-cassette storage box according to claim 20 wherein the first-to-fourth engaging claws of said first engaging means are made of resilient synthetic resin and molded integral to the first outer surface or the outer surface portion; each of said first-to-fourth engaging claws has chamfers formed at its projected end and along the direction in which it is engaged; the first-to-fourth engaged claws of said second engaging means are made of resilient synthetic resin and molded integral to the second outer surface or the outer surface portion; each of said first-to-fourth engaged claws has chamfers at its projected end and along the direction in which it is engaged; and when the first or second engaging means on said accessory is contacted with the second or first engaging means on said tape-cassette storage box in a direction perpendicular to the direction in which the first and second engaging means are engaged each other, the chamfer of each of the first-to-fourth engaging claws of said first engaging means is contacted with that of each of the first-to-fourth engaged claws of said second engaging means.

4. An accessory for the tape-cassette storage box according to claim 2 wherein the first engaging means has a holding means; the second engaging means has a held means; and when the first-to-fourth engaging claws of said first engaging means or the first-to-fourth engaged claws of said second engaging means on the tape-cassette storage box are engaged with the first-to-fourth engaged claws of said second engaging means or the first-to-fourth engaging claws of said first engaging means on the accessory, the holding means of said first engaging means comes to hold the held means of said second engaging means and the engagement between the first and second engaging means is kept till a force larger than a predetermined value is applied thereto.

5. An accessory for the tape-cassette storage box according to claim 4 wherein the first-to-fourth engaging claws of said first engaging means are made of resilient synthetic resin and molded integral to the first outer surface or the outer surface portion; each of the first-to-fourth engaging claws has chamfers formed at its projected end and along the direction in which it is engaged; the first-to-fourth engaged claws of said second engaging means are made of resilient synthetic resin and molded integral to the second outer surface or the outer surface portion; each of the first-to-fourth engaged claws has chamfers formed at its projected end and along the direction in which it is engaged; and when the first or second engaging means on said accessory is contacted with the second or first engaging means on said tape-cassette storage box in a direction perpendicular to the direction in which the first and second engaging means are engaged each other, the chamfer of each of the first-to-fourth engaging claws of said first engaging means is contacted with that of each of the first-to-fourth engaged claws of said second engaging means.

6. An accessory for the tape-cassette storage box according to claim 2 wherein the first engaging means has a first guide member arranged between the first and third engaging claws and has a second guide member arranged between the second and fourth engaging claws, and the first and second engaged claws or third and fourth engaged claws of said second engaging means on the tape-cassette storage box or the accessory are guided by the first and second guide members of said first engaging means on the tape-cassette storage box or the accessory causing the first engaging means on the tape-cassette storage box or the accessory to be engaged with the second engaging means on the tape-cassette storage box or the accessory.

7. An accessory for the tape-cassette storage box according to claim 6 wherein the first-to-fourth engaging claws, first guide member and second guide member are spaced from one another; the first-to-fourth engaging claws of said first engaging means are made of resilient synthetic resin and molded integral to the first outer surface or the outer surface portion; each of first-to-fourth engaging claws has chamfers formed at its projected end and along the direction in which it is engaged; the first-to-fourth engaged claws of said second engaging means are made of resilient synthetic resin and molded integral to the second outer surface or the outer surface portion; each of said first-to-fourth engaged claws has chamfers formed at its projected end and along the direction in which it is engaged; and when the first or second engaging means on the accessory is contacted with the second or first engaging means on the tape-cassette storage box in a direction perpendicular to the direction in which the first and second engaging means are engaged, the chamfer of each of the first-to-fourth engaging claws of said first engaging means is contacted with that of each of the first-to-fourth engaged claws of said second engaging means.

8. An accessory for the tape-cassette storage box according to claim 6 wherein the first guide member is a band-shaped plate formed on an imaginary line combining the first engaging claw with the third one and projected substantially perpendicular to the first outer surface or the outer surface portion; the second guide member is a band-shaped plate formed on an imaginary line combining the second engaging claw with the fourth one and projected substantially perpendicular to the first outer surface or the outer surface portion; and the projected end face of each of the first and second engaged claws or third and fourth engaged claws of said second engaging means on the accessory or the tape-cassette storage box is slidably contacted with the first and second guide members of said first engaging means on the tape-cassette storage box or the accessory causing the first-to-fourth engaged claws of said second engaging means on the accessory or the tape-cassette storage box to be engaged with the first-to-fourth engaging claws of said first engaging means on the tape-cassette storage box or the accessory.

9. An accessory for the tape-cassette storage box according to claim 8 wherein the first-to-fourth engaging claws, first guide member and second guide member are spaced from one another; the first-to-fourth engaging claws of said first engaging means are made of resilient synthetic resin and molded integral to the first outer surface or the outer surface portion; each of the first-to-fourth engaging claws has chamfers formed at its projected end and along the direction in which it is engaged; the first-to-fourth engaged claws of said second engaging means are made of resilient synthetic resin and molded integral to the second outer surface or the outer surface portion; each of the first-to-fourth engaged claws has chamfers formed at its projected end and along the direction in which it is engaged; and when the first or second engaging means on the accessory is contacted with the second or first engaging means on the tape-cassette storage box in a direction perpendicular to the direction in which the first and second engaging means are engaged, the chamfer of each of the first-to-fourth engaging claws of said first engaging means is contacted with that of each of the first-to-fourth engaged claws of said second engaging means.

10. An accessory for the tape-cassette storage box according to claim 8 wherein the first engaging means has a holding means; the second engaging means has a held means; and when the first-to-fourth engaging claws of said first engaging means or the first-to-fourth engaged claws of said second engaging means on the tape-cassette storage box are engaged with the first-to-fourth engaged claws of said second engaging means or the first-to-fourth engaging claws of said first engaging means on the accessory, the holding means of said first engaging means comes to hold the held means of said second engaging means and the engagement between the first and second engaging means is kept till a force larger than the predetermined value is applied thereto.

11. An accessory for the tape-cassette storage box according to claim 10 wherein the first-to-fourth engaging claws of said first engaging means, first and second guide members are spaced from one another; the first-to-fourth engaging claws of said first engaging means are made of resilient synthetic resin and molded integral to the first outer surface or the outer surface portion; each of the first-to-fourth engaging claws has chamfers formed at its projected end and along the direction in which it is engaged; the first-to-fourth engaged claws of said second engaging claws are made of resilient synthetic resin and molded integral to the second outer surface or the outer surface portion; each of the first-to-fourth engaged claws has chamfers formed at its projected end and along the direction in which it is engaged; and when the first or second engaging means on the accessory is contacted with the second or first engaging means on the tape-cassette storage box in a direction perpendicular to the direction in which the first and second engaging means are engaged, the chamfer of each of the first-to-fourth engaging claws of said first engaging means is contacted with that of each of the first-to-fourth engaged claws of said second engaging means.

12. An accessory for the tape-cassette storage box according to claim 10 wherein the second engaging means includes a third guide member of band shape formed on the second outer surface or the outer surface portion along an imaginary line combining the first engaged claw with the third one and projected substantially perpendicular to the second outer surface or the outer surface portion, and a fourth guide member of band shape formed on the second outer surface or the outer surface portion along an imaginary line combining the second engaged claw with the fourth one and projected substantially perpendicular to the second outer surface or the outer surface portion; the holding means of said first engaging means includes openings each formed in the center of the longitudinal direction of each of the first and second guide members and serving to separate the center portion of each of the first and second guide members from the first outer surface or the outer surface portion, a first stopper formed in the center of the longitudinal direction of the first guide member and nearer the first engaging claw and projected in the same direction as the ends of the first and third engaging claws are projected, and a second stopper formed in the center of the longitudinal direction of the second guide member and nearer the fourth engaging claw and projected in the same direction as the ends of the second and fourth engaging claws are projected; the held means of said second engaging means includes a first engaged projection formed in the center of the longitudinal direction of the third guide member and projected in the same direction as the ends of the first and third engaged claws are projected, and a second engaged projection formed in the center of the longitudinal direction of the fourth guide member and projected in the same direction as the ends of the second and fourth engaged claws are projected; and when the first-to-fourth engaging claws of said first engaging means on the accessory or the tape-cassette storage box are engaged with the first-to-fourth engaged claws of said second engaging means on the tape-cassette storage box or the accessory, the first and second stoppers of said first engaging means on the accessory or the tape-cassette storage box are contacted with the first and second engaged projections of said second engaging means on the tape-cassette storage box or the accessory and the engagement between the first engaging means on the accessory or the tape-cassette storage box and the second engaging means on the tape-cassette storage box or the accessory is maintained till a force larger than the predetermined value is applied thereto.

13. An accessory for the tape-cassette storage box according to claim 12 wherein the first-to-fourth engaging claws of said first engaging means, and first and second guide members are spaced from one another; the first-to-fourth engaging claws of said first engaging means are made of resilient synthetic resin and molded integral to the first outer surface or the outer surface portion; each of the first-to-fourth engaging claws has chamfers formed at its projected end and along the direction in which it is engaged; the first-to-fourth engaged claws of said second engaging means are made of resilient synthetic resin and molded integral to the second outer surface or the outer surface portion; each of the first-to-fourth engaged claws has chamfers formed at its projected end and along the direction in which it is engaged; and when the first or second engaging means on the accessory is contacted with the first or second engaging means on the tape-cassette storage box in a direction perpendicular to the direction in which the first and second engaging means are engaged, the chamfer of each of the first-to-fourth engaging claws of said first engaging means is contacted with that of each of the first-to-fourth engaged claws of said second engaging means.

14. An accessory for the tape-cassette storage box according to claim 12 wherein the first and second engaged projections of the held means of said second engaging means are made hollow.

15. An accessory for the tape-cassette storage box according to claim 14 wherein the first-to-fourth engaging claws of said first engaging means, and the first and second guide members are spaced from one another; the first-to-fourth engaging claws of said first engaging means are made of resilient synthetic resin and molded integral to the first outer surface or the outer surface portion; each of the first-to-fourth engaging claws has chamfers formed at its projected end and along the direction in which it is engaged; the first-to-fourth engaged claws of said second engaging means are made of resilient synthetic resin and molded integral to the second outer surface or the outer surface portion; each of the first-to-fourth engaged claws has chamfers formed at its projected end and along the direction in which it is engaged; and when the first or second engaging means on the accessory is contacted with the second or first engaging means on the tape-cassette storage box in a direction perpendicular to the direction in which the first and second engaging means are engaged, the chamfer of each of the first-to-fourth engaging claws of said first engaging means is contacted with that of each of the first-to-fourth engaged claws of said second engaging means.

16. An accessory for the tape-cassette storage box according to claim 10 wherein the second engaging means includes a third guide member of band shape formed on the second outer surface or the outer surface portion along an imaginary line combining the first engaged claw with the third one and projected substantially perpendicular to the second outer surface or the outer surface portion, and a fourth guide member of band shape formed on the second outer surface or the outer surface portion along an imaginary line combining the second engaged claw with the fourth one and projected substantially perpendicular to the second outer surface or the outer surface portion; the holding means of said first engaging means has a pair of projections arranged in the center of the longitudinal direction of the first and second guide members and along the direction in which the first and second guide members guided; the held means of said second engaging means has a projection arranged in the center of the longitudinal direction of the third and fourth guide members; and when the first-to-fourth engaging claws of said first engaging means on the accessory or the tape-cassette storage box are engaged with the first-to-fourth engaged claws of said second engaging means on the tape-cassette storage box or the accessory, at least one of the pair of projections on the holding means of said first engaging means comes to hold at least one of projections on the third and fourth guide members of said second engaging means to keep the first engaging means on the accessory or the tape-cassette storage box engaged with the second engaging means on the tape-cassette storage box or the accessory till a force larger than the predetermined value is applied thereto.

* * * * *